United States Patent
Löhr et al.

(10) Patent No.: US 12,490,138 B2
(45) Date of Patent: Dec. 2, 2025

(54) AGGREGATED MAXIMUM BIT RATE FOR LOGICAL CHANNELS

(71) Applicant: Lenovo (Singapore) Pte. Ltd., New Tech Park (SG)

(72) Inventors: Joachim Löhr, Wiesbaden (DE); Hyung-Nam Choi, Ottobrunn (DE); Prateek Basu Mallick, Dreieich (DE); Genadi Velev, Darmstadt (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 224 days.

(21) Appl. No.: 18/559,524

(22) PCT Filed: May 9, 2022

(86) PCT No.: PCT/IB2022/054293
§ 371 (c)(1),
(2) Date: Nov. 7, 2023

(87) PCT Pub. No.: WO2022/234550
PCT Pub. Date: Nov. 10, 2022

(65) Prior Publication Data
US 2024/0244475 A1 Jul. 18, 2024

Related U.S. Application Data

(60) Provisional application No. 63/186,052, filed on May 7, 2021.

(51) Int. Cl.
*H04W 28/02* (2009.01)
*H04L 47/215* (2022.01)

(52) U.S. Cl.
CPC ....... *H04W 28/0257* (2013.01); *H04L 47/215* (2013.01)

(58) Field of Classification Search
CPC ... H04W 72/23; H04W 72/569; H04W 72/21; H04W 72/0453; H04W 72/56;
(Continued)

(56) References Cited

U.S. PATENT DOCUMENTS

2009/0196175 A1* 8/2009 Sammour ............. H04W 36/02
370/230.1
2021/0144580 A1* 5/2021 Alfarhan ............... H04W 76/27
(Continued)

FOREIGN PATENT DOCUMENTS

WO 2015062873 A2 5/2015
WO 2019217530 A1 11/2019

OTHER PUBLICATIONS

PCT/IB2022/054293, "Notification of Transmittal of the International Search Report and the Written Opinion of the International Searching Authority, or the Declaration", International Searching Authority, Jul. 11, 2022, pp. 1-17.
(Continued)

*Primary Examiner* — Djenane M Bayard
(74) *Attorney, Agent, or Firm* — Kunzler Bean & Adamson

(57) ABSTRACT

Apparatuses, methods, and systems are disclosed for enforcing a group-specific maximum bit rate. One method includes receiving a configuration for a set of logical channels (LCHs) and receiving a configuration for a group token bucket associated with a subset of the set of LCHs, the configuration for the group token bucket including an aggregated maximum bit rate and a bucket size duration. The method includes maintaining a variable $B_{S-MBR}$ associated with the group token bucket, the variable $B_{S-MBR}$ representing a number of bits to be used for transmission of one or more data units of the subset of LCHs. The method includes multiplexing data from the set of LCHs based on the variable
(Continued)

$B_{S\text{-}MBR}$ and transmitting the multiplexed data in a transport block.

15 Claims, 8 Drawing Sheets

(58) Field of Classification Search
CPC .......... H04W 74/0833; H04W 74/006; H04W 56/0045; H04W 72/04; H04W 52/146; H04W 52/281; H04W 52/325; H04W 52/327; H04W 52/34; H04W 52/346; H04W 72/1268; H04W 74/004; H04W 72/0446; H04W 74/0838; H04W 28/0252; H04W 72/1263; H04W 76/27; H04W 28/0268; H04W 72/563; H04W 28/065; H04W 80/04; H04W 92/18; H04W 28/06; H04W 8/04; H04W 88/16; H04W 28/14; H04W 72/12; H04W 72/1273; H04W 76/14; H04W 28/0278; H04W 72/20; H04W 72/54; H04L 47/215; H04L 5/0007; H04L 5/0053; H04L 5/0094; H04L 47/10; H04L 1/1896; H04L 47/24; H04L 5/0092; H04L 63/08; H04L 47/30; H04L 5/0064; H04L 63/02; H04L 63/0869; H04L 67/306
See application file for complete search history.

(56) References Cited

U.S. PATENT DOCUMENTS

2022/0295334 A1\* 9/2022 Sun .................. H04W 72/0453
2022/0408372 A1\* 12/2022 Feuersaenger .... H04W 74/0833

OTHER PUBLICATIONS

GSMA, "Official Document NG.116", Generic Network Slice Template Version 4.0, Nov. 23, 2020, pp. 1-66.
NSN (Rapporteur), "Discussion on Uplink Bearer Split", 3GPP TSG-RAN WG2 Meeting #85bis R2-141102, Mar. 31-Apr. 4, 2014, pp. 1-27.
Huawei et al., "Discussion on restricting the rate per UE per network slice", 3GPP TSG-RAN WG2 Meeting #112 electronic R2-2010183, Nov. 2-13, 2020, pp. 1-4.
Ericsson, "SMBR enforcement in RAN", 3GPP TSG-RAN WG2 #113bis-e Tdoc R2-2103647, Apr. 12-20, 2021, pp. 1-3.
3GPP, "3rd Generation Partnership Project; Technical Specification Group Services and System Aspects; Study on enhancement of network slicing; Phase 2 (Release 17)", 3GPP TR 23.700-40 V17.0.0, Mar. 2021, pp. 1-224.
3GPP, "3rd Generation Partnership Project; Technical Specification Group Services and System Aspects; System architecture for the 5G System (5GS); Stage 2 (Release 16)", 3GPP TS 23.501 V16.8.0, Mar. 2021, pp. 1-451.
3GPP, "3rd Generation Partnership Project; Technical Specification Group Radio Access Network; NR; Multiplexing and channel coding (Release 16)", 3GPP TS 38.212 V16.5.0, Mar. 2021, pp. 1-152.
3GPP, "3rd Generation Partnership Project; Technical Specification Group Radio Access Network; NR; Physical layer procedures for control (Release 16)", 3GPP TS 38.213 V16.5.0, Mar. 2021, pp. 1-183.
3GPP, "3rd Generation Partnership Project; Technical Specification Group Radio Access Network; NR; Physical layer procedures for data (Release 16)", 3GPP TS 38.214 V16.5.0, Mar. 2021, pp. 1-171.
3GPP, "3rd Generation Partnership Project; Technical Specification Group Radio Access Network; NR; Medium Access Control (MAC) protocol specification (Release 16)", 3GPP TS 38.321 V16.4.0, Mar. 2021, pp. 1-157.

\* cited by examiner

AGGREGATED MAXIMUM BIT RATE FOR LOGICAL CHANNELS

CROSS-REFERENCE TO RELATED APPLICATIONS

This application claims priority to U.S. Provisional Patent Application No. 63/186,052 entitled "SLICE-SPECIFIC MAXIMUM BITRATE ENFORCEMENT" and filed on 7 May 2021 for Joachim Löhr, Hyung-Nam Choi, Prateek Basu Mallick, Genadi Velev, and Ravi Kuchibhotla, which application is incorporated herein by reference.

FIELD

The subject matter disclosed herein relates generally to wireless communications and more particularly relates to group-specific Maximum Bitrate enforcement.

BACKGROUND

In certain wireless networks, network slicing may be supported. A "network slice" refers to a portion of a core network optimized for a certain traffic type or communication service. A network slice customer (e.g., a vertical or service provider) can negotiate or request network slice characteristics from the network operator deploying the network slice. The network slice characteristics may be identified by network slice attributes. Possible network slice attributes are described in the Groupe Speciale Mobile Association ("GSMA") Fifth Generation Joint Activity ("5GJA") working group in the document GSMA 5GJA NG.116 "Generic Network Slice Template." The network operator uses the Generic Network Slice Template ("GST") to derive the network slice characteristics.

BRIEF SUMMARY

Disclosed are procedures for enforcing a group-specific maximum bit rate. Said procedures may be implemented by apparatus, systems, methods, or computer program products.

One method at a User Equipment ("UE") includes receiving a configuration for a set of logical channels ("LCHs") and receiving a configuration for a group token bucket associated with a subset of LCHs of the set of LCHs, wherein the configuration for the group token bucket includes an aggregated maximum bit rate ("MBR") and a bucket size duration ("BSD"). The method includes maintaining, at each logical channel ("LCH") of the subset of LCHs, a variable $B_{S-MBR}$ associated with the group token bucket, the variable $B_{S-MBR}$ representing a number of bits to be used for transmission of one or more data units of the subset of LCHs, where the variable $B_{S-MBR}$ is incremented with the aggregated MBR. The method includes multiplexing data from the set of LCHs based on the variable $B_{S-MBR}$ and transmitting the multiplexed data in a transport block ("TB").

One method at a network device includes transmitting, to a UE, a configuration for a set of LCHs and transmitting, to the UE, a configuration for a group token bucket associated with a subset of LCHs of the set of LCHs. Here, the configuration for the group token bucket includes an aggregated MBR and a BSD. The second method includes receiving a TB transmitted by the UE, where the TB includes data multiplexed from the set of LCHs based on a variable $B_{S-MBR}$ associated with the group token bucket.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
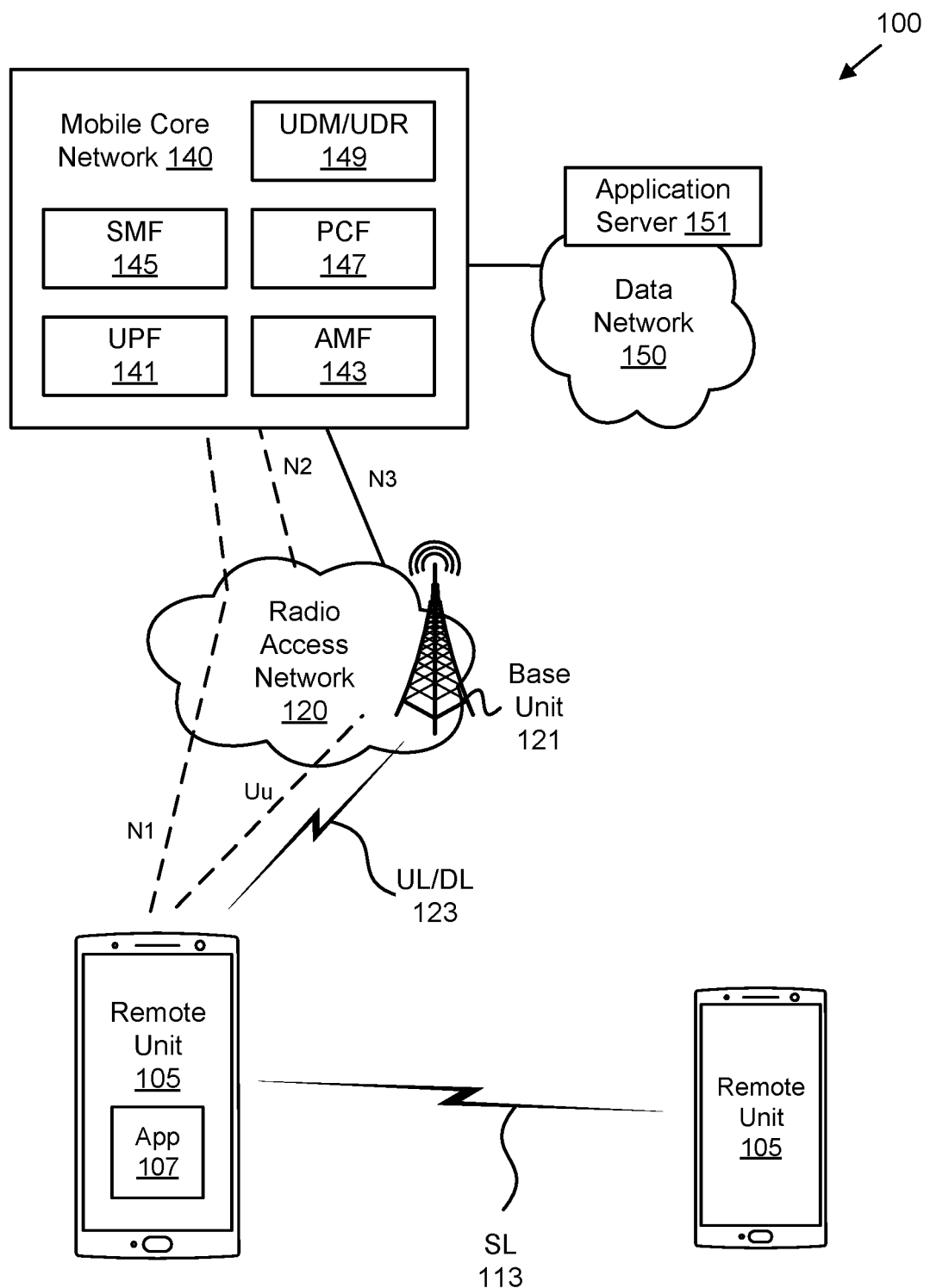
FIG. 1 is a schematic block diagram illustrating one embodiment of a wireless communication system for enforcing a group-specific maximum bit rate.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for enforcing a slice-specific maximum bitrate. A network slice customer can negotiate (or request) slice characteristics (or attributes) from the network operator (e.g., Fifth-Generation System ("5GS")) deploying the network slice. The network slice characteristics may be identified by network slice attributes. Possible network slice attributes are described in the GSMA 5GJA working group in the document GSMA 5GJA NG.116 "Generic Network Slice Template". The network operator uses the Generic Network Slice Template ("GST") to derive the network slice characteristics.

One attribute in the GST is Maximum downlink throughput. This attribute describes the maximum data rate supported by the network slice per UE in downlink. These parameters may be used to offer different contract qualities like gold, silver, and bronze.

TABLE 1

Maximum downlink throughput Table

| Parameters | |
|---|---|
| Value | Integer |
| Measurement unit | kbps |
| Example | Bronze customer: 50 000 Kbps |
| | Silver customer: 400 000 Kbps |
| | Gold customer: 1 000 000 Kbps |
| Tags | Character attribute/Functional |
| | Key Performance Indicator |
| | ("KPI") |
| Attribute Presence | |
| Mandatory | |
| Conditional | |
| Optional | X |

Another attribute in the GST is Maximum uplink throughput per UE. These parameters may be used in order to offer different contract qualities like gold, silver, and bronze.

TABLE 2

Maximum uplink throughput per UE Table

| Parameters | |
|---|---|
| Value | Integer |
| Measurement unit | kbps |
| Example | Bronze customer: 10 000 Kbps |
| | Silver customer: 100 000 Kbps |
| | Gold customer: 200 000 Kbps |
| Tags | Character attribute/Performance |
| | KPI |
| Attribute Presence | |
| Mandatory | |
| Conditional | |
| Optional | X |

The maximum uplink/downlink data rate limitation may include both Guaranteed Bit Rate ("GBR") and non-GBR traffic. One main aspect targeted in this document is how to limit the uplink data rate of UE for a network slice, ensuring that the aggregate of the PDU sessions that use the network slice are rate limited to the rate defined for the Network Slice in DL and UL on both GBR and non-GBR traffic.

In some embodiments, S-MBR enforcement may be provided by configuring different resources per slice. Currently, the AMF sends to the RAN (e.g., over the NG interface) maximum uplink and/or downlink ("UL/DL") data rate for the slice for the UE (identified as S-MBR—"Slice MBR") when the UE context is passed to the RAN. The RAN is to ensure that the traffic of GBR QOS Flows is not affected up to the amount indicated by the Guaranteed Flow Bit Rate ("GFBR") value of the respective QoS Flow. The RAN also is to ensure that the aggregated bitrate across all GBR and Non-GBR QOS Flows is not exceeding the S-MBR by shaping the traffic of non-GBR QOS Flows and/or dropping packets exceeding the GFBR from GBR QOS Flows with the Maximum Flow Bit Rate ("MFBR") being greater than the GFBR.

As described above, Rel-15 5G network slicing feature enables network operators to optimize implementation of tailor-made functionality and network operation specific to the needs of a market scenario. The network slicing feature can be summarized as follows:

A network slice is a logical network that provides specific network capabilities and network characteristics. The network slice is identified by an S-NSSAI and may consist of a RAN part and a core network ("CN") part. While the network can support large number of slices (e.g., hundreds), the UE need not support more than eight (8) slices simultaneously. Traffic for different slices is handled by different PDU sessions.

An S-NSSAI uniquely identifies a network slice and is comprised of a Slice/Service type ("SST") and a Slice Differentiator ("SD"). The Slice/Service type ("SST") refers to the expected network slice behavior in terms of features and services. The SST field is of length 8 bits and may have standardized and non-standardized values: values 0 to 127 belong to the standardized SST range and are defined in 3GPP Technical Specification ("TS") 23.501, and values 128 to 255 belong to the Operator-specific range.

The Slice Differentiator ("SD") is optional information that complements the Slice/Service type(s) to differentiate amongst multiple network slices of the same Slice/Service type. For instance, for an SST of value eMBB, multiple SDs may be defined such as "Company X eMBB slice," "Company Y eMBB slice" etc. The SD field is of length 24 bits.

The UE subscription data in the UDM/UDR stores a list of Subscribed S-NSSAI(s), which a UE is subscribed to use in a PLMN (in a home or visited PLMN).

A UE may be configured by the network with the following network slice configuration: Allowed NSSAI and Configured NSSAI. The Allowed NSSAI is a list of S-NSSAIs provided by the serving PLMN during e.g. a Registration procedure, indicating the S-NSSAIs values the UE could use in the serving PLMN for the current Registration Area: derived by network from the Subscribed S-NSSAI and taking into account the S-NSSAIs which are valid for the current registration area and Access Type provided by the AMF the UE has registered with; used by UE, e.g., to create information element ("IE") "Requested NSSAI" in the NAS registration request message and to establish PDU Sessions in the current registration area.

The Configured NSSAI is a list of S-NSSAIs applicable to one or more PLMNs; derived by network from the Subscribed S-NSSAI: used by UE if there are no allowed S-NSSAI(s) for the current PLMN: contains only S-NSSAI values from the serving PLMN (can be the home PLMN ("HPLMN") or a visited PLMN ("VPLMN")): obtained from the AMF upon successful completion of a UE's Registration procedure over an Access Type or as part of UE network slice configuration update procedure: used by UE, e.g., to create the IE "Requested NSSAI" in the NAS registration request message.

In Rel-17 the network slicing feature is intended to be further enhanced to make it more flexible to support services and specific deployment scenarios. The objectives of the network slicing enhancements include:

1. Support slice-based cell reselection, specify mechanisms and signaling including
   a. To assist cell reselection, broadcast the supported slice info of the current cell and neighbor cells, and cell reselection priority per slice in system information message.
   b. To assist cell reselection, include slice info (with similar information as in a System Information ("SI") message) in RRCRelease message.
2. Support slice-based RACH configuration, specify mechanisms and signaling including, for Mobile Originating cases
   a. Configure separated Physical Random Access Channel ("PRACH") configuration (e.g., transmission occasions of time-frequency domain and preambles) for slice or slice group
   b. Configure Random Access Channel ("RACH") parameters prioritization (e.g., scalingFactorBI and power-RampingStepHighPriority) for slice or slice group
   c. Determine how this works with existing functionality, which may include how to perform RACH type selection (e.g., 2-step and 4-step), support of RACH fallback cases, handling of simultaneous configuration with similar functions such as legacy Random-Access ("RA") prioritization (e.g., Multimedia Priority Service ("MPS") and Mission Critical Service UEs).

In NR for the uplink the process by which a UE creates a MAC PDU to transmit using the allocated radio resources is fully standardized: this is designed to ensure that the UE satisfies the Quality of Service ("QoS") of each configured radio bearer in a way which is optimal and consistent between different UE implementations. Based on the uplink transmission resource grant message signaled on the Physical Downlink Control Channel ("PDCCH") (i.e., Downlink Control Information ("DCI")), the UE has to decide on the amount of data for each logical channel to be included in the new MAC PDU, and, if necessary, also to allocate space for a MAC Control Element. The Logical Channel Prioritization ("LCP") procedure is applied when a new transmission is performed.

The current defined LCH restrictions are not sufficient to provide an efficient tool for an S-MBR enforcement. This disclosure presents several solutions in the UE for the enforcement of a slice specific maximum bit rate.

Disclosed are solutions for enforcing a slice-specific maximum bitrate. The solutions may be implemented by apparatus, systems, methods, or computer program products. In some embodiments, a Token bucket may be configured for a group of Logical Channels ("LCHs") belonging to the same slice in order to enforce a Slice-aggregated Maximum Bit Rate ("S-MBR"). Here, a new group bucket is configured in addition to the legacy bucket configured for Prioritized Bit Rate ("PBR") enforcement.

In some embodiments, uplink ("UL") resources are allocated per group of LCHs. DCI allocates uplink resources, e.g., Physical Uplink Shared Channel ("PUSCH") resources, for a specific group of LCHs/radio bearer. The DCI contains group ID indicating for which LCH group the UL resource are allocated for. Each LCH is configured with a group ID.

In some embodiments, a gNB (i.e., a Fifth Generation ("5G") base station) dynamically suspends radio bearer/logical channel for uplink data transmissions. Here, the gNB signals within a new Medium Access Control ("MAC") Control Element ("CE") a bitmap which indicates the suspension status of an LCH/radio bearer.

FIG. 1 depicts a wireless communication system 100 for enforcing a group-specific maximum bit rate, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the Fifth-Generation ("5G") cellular system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Furthermore, the UL communication signals may comprise one or more uplink channels, such as the Physical Uplink Control Channel ("PUCCH") and/or Physical Uplink Shared Channel ("PUSCH"), while the DL communication signals may comprise one or more downlink channels, such as the Physical Downlink Control Channel ("PDCCH") and/or Physical Downlink Shared Channel ("PDSCH"). Here, the RAN 120 is an intermediate network that provides the remote units 105 with access to the mobile core network 140.

In various embodiments, the remote units 105 may communicate directly with each other (e.g., device-to-device communication) using sidelink communication 113. Here, sidelink transmissions may occur on sidelink resources. A remote unit 105 may be provided with different sidelink communication resources according to different allocation modes. As used herein, a "resource pool" refers to a set of resources assigned for sidelink operation. A resource pool consists of a set of resource blocks (i.e., Physical Resource Blocks ("PRB")) over one or more time units (e.g., subframe, slots, Orthogonal Frequency Division Multiplexing ("OFDM") symbols). In some embodiments, the set of resource blocks comprises contiguous PRBs in the frequency domain. A PRB, as used herein, consists of twelve consecutive subcarriers in the frequency domain.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or Packet Data Network ("PDN") connection) with the mobile core network 140 via the RAN 120. The PDU session represents a logical connection between the remote unit 105 and the User Plane Function ("UPF") 141. The mobile core network 140 then relays traffic between the remote unit 105 and the application server 151 in the packet data network 150 using the PDU session (or other data connection).

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, i.e., a tunnel between the remote unit 105 and a PDN Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

Note that during NR operation on unlicensed spectrum (referred to as "NR-U"), the base unit 121 and the remote unit 105 communicate over unlicensed (i.e., shared) radio spectrum. Similarly, during LTE operation on unlicensed spectrum (referred to as "LTE-U"), the base unit 121 and the remote unit 105 also communicate over unlicensed (i.e., shared) radio spectrum.

In one embodiment, the mobile core network 140 is a 5G Core network ("5GC") or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO") and/or Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM") and a User Data Repository ("UDR"). In some embodiments, the UDM is co-located with the UDR, depicted as combined entity "UDM/UDR" 149. Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Spectrum ("NAS") signaling. NAS ciphering and integrity protection, registration management, connection management, mobility management, access authentication and authorization, security context management. The SMF 145 is responsible for session management (i.e., session establishment, modification, release), remote unit (i.e., UE) Internet Protocol ("IP") address allocation and management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for enforcing a group-specific maximum bit rate apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station/base unit, but it is replaceable by any other radio access node, e.g., RAN node, ng-cNB, eNB, Base Station ("BS"), Access Point ("AP"), NR BS, 5G NB, Transmission and Reception Point ("TRP"), etc. Additionally, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for enforcing a group-specific maximum bit rate.

In various embodiments, the maximum UL date for a slice is enforced in the UE by configuring a token bucket configuration which is applicable to the group of logical channels belonging to a particular slice. During LCP procedure UE is only allowed to transmit data of LCHs belonging to a particular slice if the corresponding slice bucket is not negative. One bucket is configured for each logical channel for the prioritized bit rate enforcement (as in legacy NR) and one bucket is required for each slice the UE has LCHs configured for, i.e., one bucket for the group of all LCHs/ radio bearers belonging to a slice for the enforcement of the aggregated maximum bit rate of the corresponding slice.

According to a first solution, a UE is configured with an aggregated maximum bit rate, e.g., also referred to as S-MBR, and a bucket size duration ("BSD"). Compared to the legacy NR operation, in addition to the logical channel priority, PBR and BSD, the RRC layer configures—for a logical channel—a maximum bit rate (i.e., S-MBR) and a second BSD, which is also referred to as BSDS-MBR. The S-MBR is configured in order to enforce an aggregated maximum bit rate per slice.

According to one embodiment, downlink control information ("DCI") allocates uplink resources, e.g., PUSCH resources, for a specific group of LCHs/radio bearer. Such group of LCHs/radio bearer may belong to one slice. The DCI contains some identifier indicating the group of radio bearer/Logical channel the uplink resources are allocated for. Each logical channel may be configured by higher layer signaling with a group identifier. Upon receiving an UL grant allocating PUSCH resources for an initial transmission, UE selects the logical channels for the UL grant that satisfies the following condition: group identifier configured for the LCH matches the ID associated to the UL grant, i.e., signaled within the UL DCI.

Figure 2:
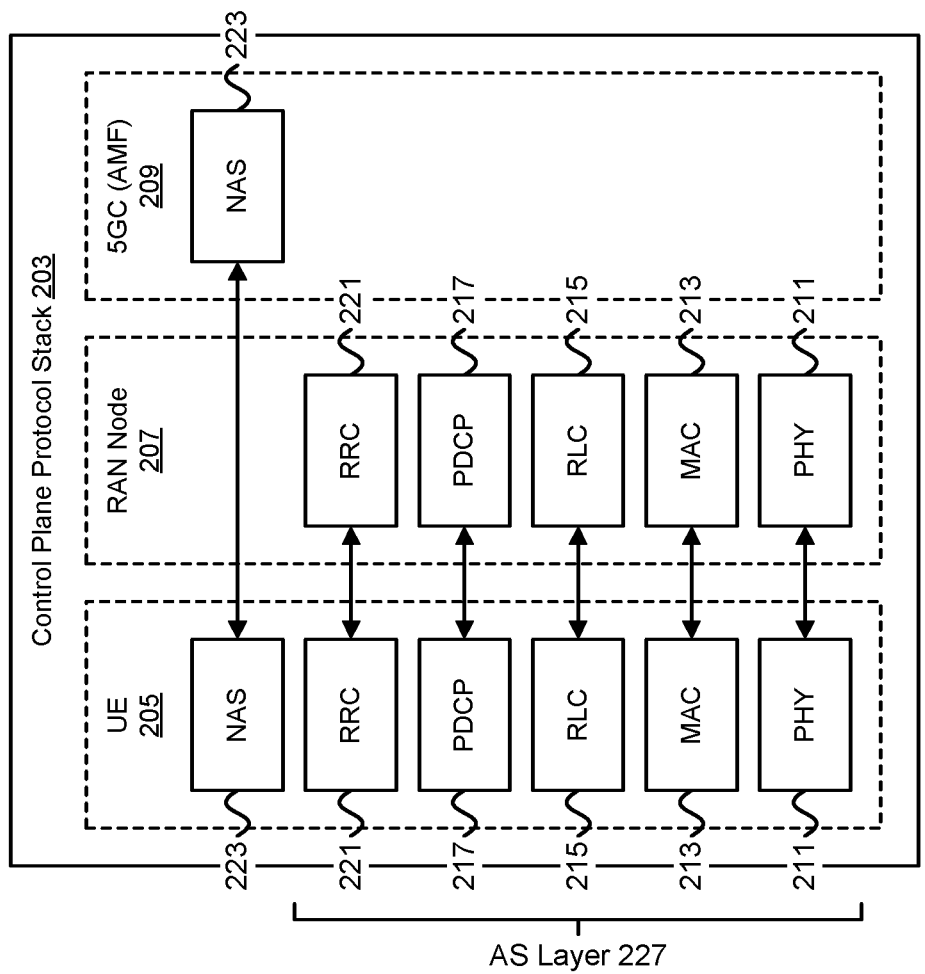
FIG. 2 is a diagram illustrating one embodiment of a New Radio ("NR") protocol stack.
Figure 2:
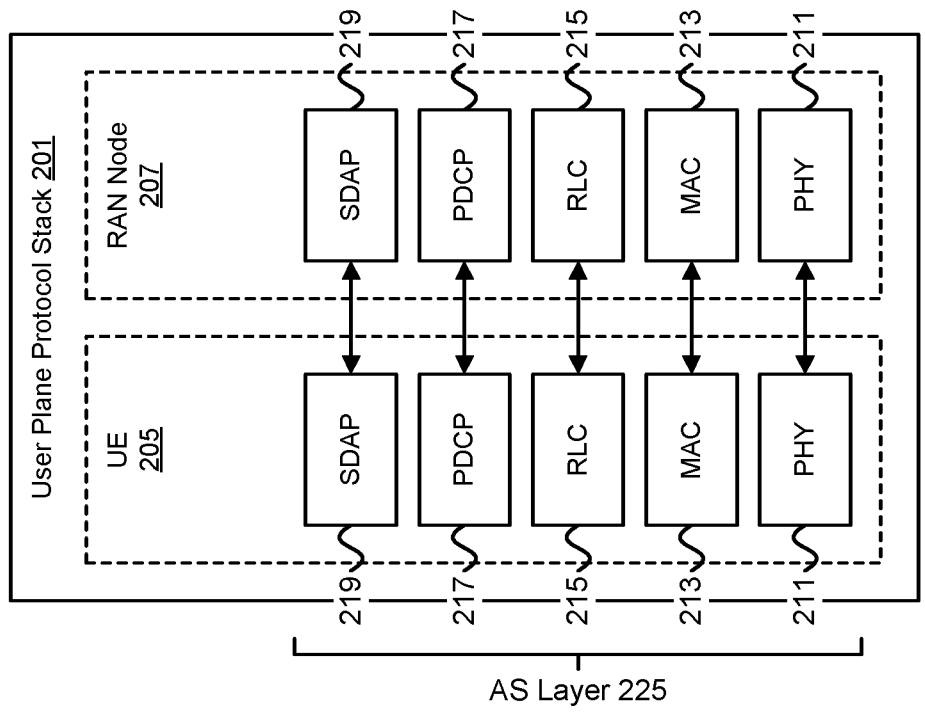

FIG. 2 depicts a protocol stack 200, according to embodiments of the disclosure. While FIG. 2 shows a UE 205, a RAN node 207 (e.g., a gNB) and a 5G core network 209 (containing, e.g., an AMF), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes the physical ("PHY") layer 211, the Medium Access Control ("MAC") sublayer 213, the Radio Link Control ("RLC") sublayer 215, a Packet Data Convergence Protocol ("PDCP") sublayer 217, and Service Data Adaptation Protocol ("SDAP") layer 219. The Control Plane protocol stack 203 includes a PHY layer 211, a MAC sublayer 213, a RLC sublayer 215, and a PDCP sublayer 217. The Control Plane protocol stack 203 also includes a Radio Resource Control ("RRC") layer 221 and a Non-Access Stratum ("NAS") layer 223.

The AS layer 225 (also referred to as "AS protocol stack") for the User Plane protocol stack 201 consists of at least the SDAP sublayer 219, PDCP sublayer 217, RLC sublayer 215 and the MAC sublayer 213, and the PHY layer 211. The AS layer 227 for the Control Plane protocol stack 203 consists of at least the RRC sublayer 221, PDCP sublayer 217, RLC sublayer 215, the MAC sublayer 213, and the PHY layer 211. The Layer-1 ("L1") comprises the PHY layer 211. The Layer-2 ("L2") is split into the SDAP sublayer 219, PDCP sublayer 217, RLC sublayer 215, and the MAC sublayer 213. The Layer-3 ("L3") includes the RRC sublayer 221 and the NAS layer 223 for the control plane and includes, e.g., an Internet Protocol ("IP") layer or PDU Layer (not depicted) for the user plane. L1 and L2 are referred to as "lower layers," while L3 and above (e.g., transport layer, application layer) are referred to as "higher layers" or "upper layers."

The physical layer 211 offers transport channels to the MAC sublayer 213. The MAC sublayer 213 offers logical channels to the RLC sublayer 215. The RLC sublayer 215 offers RLC channels to the PDCP sublayer 217. The PDCP sublayer 217 offers radio bearers to the SDAP sublayer 219 and/or RRC layer 221. The SDAP sublayer 219 maps QoS flows within a PDU Session to a corresponding Data Radio Bearer over the air interface and the SDAP sublayer 219 interfaces the QoS flows to the 5GC (e.g., to user plane function, UPF). The RRC layer 221 provides for the addition, modification, and release of Carrier Aggregation ("CA") and/or Dual Connectivity ("DC"). The RRC layer 221 also manages the establishment, configuration, maintenance, and release of Signaling Radio Bearers ("SRBs") and Data Radio Bearers ("DRBs"). In certain embodiments, a RRC entity functions for detection of and recovery from radio link failure.

The NAS layer 223 is between the UE 205 and an AMF in the 5GC 509. NAS messages are passed transparently through the RAN. The NAS layer 223 is used to manage the establishment of communication sessions and for maintaining continuous communications with the UE 205 as it moves between different cells of the RAN. In contrast, the AS layers 225 and 227 are between the UE 205 and the RAN (i.e., RAN node 207) and carry information over the wireless portion of the network. While not depicted in FIG. 2, the IP layer exists above the NAS layer 223, a transport layer exists above the IP layer, and an application layer exists above the transport layer.

The MAC layer 213 is the lowest sublayer in the Layer-2 architecture of the NR protocol stack. Its connection to the PHY layer 211 below is through transport channels, and the connection to the RLC layer 215 above is through logical channels. The MAC layer 213 therefore performs multiplexing and demultiplexing between logical channels and transport channels: the MAC layer 213 in the transmitting side constructs MAC PDUs, known as transport blocks, from MAC Service Data Units ("SDUs") received through logical channels, and the MAC layer 213 in the receiving side recovers MAC SDUs from MAC PDUs received through transport channels.

The MAC layer 213 provides a data transfer service for the RLC layer 215 through logical channels, which are either control logical channels which carry control data (e.g., RRC signaling) or traffic logical channels which carry user plane data. On the other hand, the data from the MAC layer 213 is exchanged with the PHY layer 211 through transport channels, which are classified as downlink or uplink. Data is multiplexed into transport channels depending on how it is transmitted over the air.

The PHY layer 211 is responsible for the actual transmission of data and control information via the air interface, i.e., the PHY Layer 211 carries all information from the MAC transport channels over the air interface on the transmission side. Some of the important functions performed by the PHY layer 211 include coding and modulation, link adaptation (e.g., Adaptive Modulation and Coding ("AMC")), power control, cell search and random access (for initial synchronization and handover purposes) and other measurements (inside the 3GPP system (i.e., NR and/or LTE system) and between systems) for the RRC layer 221. The PHY layer 211 performs transmissions based on transmission parameters, such as the modulation scheme, the coding rate (i.e., the modulation and coding scheme ("MCS")), the number of physical resource blocks, etc.

The Logical Channel Prioritization ("LCP") procedure is applied whenever a new transmission is performed. The RRC layer 221 controls the scheduling of uplink data by signaling the following parameters for each logical channel, per MAC entity:

priority where an increasing priority value indicates a lower priority level;

prioritisedBitRate which sets the Prioritized Bit Rate ("PBR"); and bucketSizeDuration which sets the Bucket Size Duration ("BSD").

The RRC layer 221 additionally controls the LCP procedure by configuring mapping restrictions for each logical channel, including:

allowedSCS-List which sets the allowed Subcarrier Spacing(s) for transmission;

maxPUSCH-Duration which sets the maximum PUSCH duration allowed for transmission;

configuredGrantType1Allowed which sets whether a configured grant Type 1 can be used for transmission;

allowedServingCells which sets the allowed cell(s) for transmission;

allowedCG-List which sets the allowed configured grant(s) for transmission; and allowedPHY-PriorityIndex which sets the allowed PHY priority index(es) of a dynamic grant for transmission.

The UE variable Bj is used for the Logical channel prioritization procedure: a different instance of Bj is maintained for each logical channel j. The MAC entity (i.e., at MAC layer 213) is to initialize the variable Bj of the logical channel to zero when the logical channel is established.

Before every instance of the LCP procedure, for each logical channel j, the MAC entity increments the value of Bj by the product of PBR×T, where T is the time elapsed since Bj was last incremented. If the value of Bj is greater than the bucket size (i.e., PBR×BSD), then the MAC entity sets Bj to the bucket size. Note that the exact moment(s) when the UE updates Bj between LCP procedures is up to UE implementation, as long as Bj is up to date at the time when a grant is processed by LCP. Note that the value of Bj can become negative as resources are allocated to the logical channel j.

When a new transmission is to be performed, the MAC entity selects the logical channels for each UL grant that satisfy all the following conditions:

the set of allowed Subcarrier Spacing index values in allowedSCS-List, if configured, includes the Subcarrier Spacing index associated to the UL grant; and maxPUSCH-Duration, if configured, is larger than or equal to the PUSCH transmission duration associated to the UL grant; and configuredGrantType1Allowed, if configured, is set to true in case the UL grant is a Configured Grant Type 1; and allowedServingCells, if configured, includes the Cell information associated to the UL grant (note that this condition does not apply to logical channels associated with a DRB configured with PDCP duplication within the same MAC entity (i.e., Carrier Aggregation ("CA") duplication) when CA duplication is deactivated for this DRB in this MAC entity); and allowedCG-List, if configured, includes the configured grant index associated to the UL grant; and allowedPHY-PriorityIndex, if configured, includes the priority index (as specified in clause 9 of 3GPP TS 38.213) associated to the dynamic UL grant.

Note that the Subcarrier Spacing ("SCS") index, PUSCH transmission duration, Cell information, and priority index are included in Uplink transmission information received from lower layers for the corresponding scheduled uplink transmission.

Before the successful completion of the Random Access procedure initiated for Dual-Active Protocol Stack ("DAPS") handover (i.e., a handover procedure that maintains the source gNB connection after reception of RRC message (HO Command) for handover and until releasing the source cell after successful random access to the target gNB), the target MAC entity is to not select the logical channel(s) corresponding to non-DAPS DRB(s) for the uplink grant received in a Random Access Response ("RAR"—also referred to as "Msg2") or the uplink grant for the transmission of the MsgA payload (i.e., the first message of a two-step Random Access procedure).

When a new transmission is performed, the MAC entity allocates resources to the logical channels as follows:

First, logical channels selected for the UL grant with Bj>0 are allocated resources in a decreasing priority order. Next, the MAC entity decrements each Bj by the total size of MAC SDUs served to logical channel j, as described above. If the PBR of a logical channel is set to infinity, the MAC entity is to allocate resources for all the data that is available for transmission on the logical channel before meeting the PBR of the lower priority logical channel(s). Note that the selection of the logical channels for the UL grant may be as described in the above selection.

After this initial allocation, if any resources remain, then all the selected logical channels are served in a strict decreasing priority order (regardless of the value of Bj) until either the data for that logical channel is exhausted or the UL grant is exhausted, whichever comes first. Note that logical channels configured with equal priority should be served equally.

If the MAC entity is requested to simultaneously transmit multiple MAC PDUs, or if the MAC entity receives the multiple UL grants within one or more coinciding PDCCH occasions (i.e., on different Serving Cells), it is up to UE implementation in which order the grants are processed.

The UE is to also follow the rules below during the above scheduling procedures: A) the UE should not segment an RLC SDU (or partially transmitted SDU or retransmitted RLC PDU) if the whole SDU (or partially transmitted SDU or retransmitted RLC PDU) fits into the remaining resources of the associated MAC entity; B) if the UE segments an RLC SDU from the logical channel, it is to maximize the size of the segment to fill the grant of the associated MAC entity as much as possible; C) the UE should maximize the transmission of data; and D) if the MAC entity is given a UL grant size that is equal to or larger than 8 bytes while having data available and allowed (according to clause 5.4.3.1) for transmission, the MAC entity is to not transmit only padding Buffer Status Report ("BSR") and/or padding.

If the MAC entity is configured with enhancedSkipUplinkTxDynamic with value true and the grant indicated to the Hybrid Automatic Repeat Request ("HARQ") entity was addressed to a Cell-Radio Network Temporary Identifier ("C-RNTI"), or if the MAC entity is configured with enhancedSkipUplinkTxConfigured with value true and the grant indicated to the HARQ entity is a configured uplink grant; and if the MAC entity is not configured with IchbasedPrioritization; and if there is no Uplink Control Information ("UCI") to be multiplexed on this PUSCH transmission as specified in 3GPP TS 38.213; and if there is no aperiodic Channel State Information ("CSI") requested for this PUSCH transmission as specified in 3GPP TS 38.212; and if the MAC PDU includes zero MAC SDUs; and if the MAC PDU includes only the periodic BSR and there is no data available for any Logical Channel Group ("LCG"), or the MAC PDU includes only the padding BSR: then the MAC entity is to not generate a MAC PDU for the HARQ entity.

Else, if the MAC entity is configured with skipUplinkTx-Dynamic with value true and the grant indicated to the HARQ entity was addressed to a C-RNTI, or the grant indicated to the HARQ entity is a configured uplink grant; and if there is no aperiodic CSI requested for this PUSCH transmission as specified in 3GPP TS 38.212; and if the MAC PDU includes zero MAC SDUs; and if the MAC PDU includes only the periodic BSR and there is no data available for any LCG, or the MAC PDU includes only the padding BSR: then the MAC entity is to not generate a MAC PDU for the HARQ entity.

Regarding logical channel priority, the logical channels are to be prioritized in accordance with the following order (highest priority listed first):

C-RNTI MAC CE or data from UL-CCCH;
Configured Grant ("CG") Confirmation MAC CE or Beam Failure Recovery ("BFR") MAC CE or Multiple Entry Configured Grant Confirmation MAC CE;
Sidelink Configured Grant ("SL CG") Confirmation MAC CE;
Listen-Before-Talk ("LBT") failure MAC CE;
MAC CE for Sidelink Buffer Status Report ("SL-BSR") prioritized according to clause 5.22.1.6;
MAC CE for BSR, with exception of BSR included for padding;
Single Entry Power Headroom Report ("PHR") MAC CE or Multiple Entry PHR MAC CE;
MAC CE for the number of Desired Guard Symbols;
MAC CE for Pre-emptive BSR;
MAC CE for SL-BSR, with exception of SL-BSR prioritized according to clause 5.22.1.6 and SL-BSR included for padding;
Data from any Logical Channel, except data from UL-CCCH;
MAC CE for Recommended bit rate query;
MAC CE for BSR included for padding;
MAC CE for SL-BSR included for padding.

Note that prioritization among CG Confirmation MAC CE, Multiple Entry Configured Grant Confirmation MAC CE, and BFR MAC CE is up to UE implementation.

The MAC entity is to prioritize any MAC CE listed in a higher order than data from any Logical Channel, except data from the Uplink Common Control Channel ("UL-CCCH"), over transmission of NR sidelink communication.

The RRC layer 221 controls the configuration of resources to logical channels. The restrictions on usage of resources to which the logical channels are mapped is the tool to support S-MBR per slice. These restrictions are specified in 3GPP TS 38.321 (see clause 5.4.3.1).

Which of these restrictions are actually available is highly dependent on the RAN capabilities, the UE capabilities, and the RAN configuration. Furthermore, whether features like CA are used depends on dynamic factors, e.g., radio coverage, traffic pattern which are driving Radio Resource Management ("RRM") logic that is orthogonal the S-MBR key issue. Hence, they are to not be assumed to be generally available.

The RRC layer 221 configures the restrictions for each logical channel using the parameters listed below. The following parameters are discussed regarding their capabilities to realize S-MBR enforcement, as well as its impacts on the end user performance and resource utilization when used with the sole purpose of S-MBR enforcement: 1) parameter allowedServingCells, 2) parameter allowedSCS-List, 3) Parameter maxPUSCH-Duration, 4) Parameter configuredGrantType1Allowed, 5) Parameter allowedCG-List, 6) Parameter allowedPHY-PriorityIndex.

Parameter allowedServingCells determines data of which LCH the MAC multiplexer may map to which serving cell(s). Generally, UEs support uplink carrier aggregation with at most 2 serving cells. Hence, this mapping restriction allows controlling the UL S-MBR of at most two slices. It should also be noted that UL CA is typically only usable in good coverage situation. Otherwise, only one of the two configured UL serving cells should be scheduled and hence only one of the two slices could transmit data in a slot (no multiplexing). It is observed that allowedServingCells supports S-MBR enforcement for two slices only.

Parameter allowedSCS-List which sets the allowed Sub-carrier Spacing(s) for transmission. Each Bandwidth Part ("BWP") of each serving cell uses just one SCS. If the gNB configures a UE with two (or more) BWPs with different SCSs on a serving cell, and if it restricts LCHs to use just one of these SCSs, it can control which UL grants the UE may use for which LCH (slice). Once configured in this way by RRC, the UE cannot serve the LCHs in the same slot (no multiplexing) even if the S-MBR has not been reached. Even if the UE supports DCI-based BWP-Switching, the network needs to account for the BWP-Switch delay when scheduling different LCHs (slices) interchangeably. It should also be noticed that not all SCSs can be used for all frequency bands. Typically, there is one optimal SCS per band—two might be usable. However, as of today, UEs support just one SCS for each band. It is observed that allowedSCS-List disable support for multiplexing within a given slot, reducing resource utilization and end-user performance.

Parameter maxPUSCH-Duration which sets the maximum PUSCH duration (entire slot or just a subset of the symbols) allowed for transmission. This parameter prevents the UE from mapping a certain LCH/slice to UL grants spanning more than a certain number of slots (only mini-slots allowed). The other non-restricted LCH/slice can still use all mini-slot and full-slot formats, hence does not enforce S-MBR for each slice. Inefficient from resources utilization as short grants add to the overhead. It is observed that maxPUSCH-Duration does not support S-MBR enforcement. Impacts the resource utilization due to added overhead.

Parameter configuredGrantType1Allowed determines whether an LCH/slice may be mapped to a configured grant Type 1. Given only one LCH will be configured with Configured Grants (semi-persistent scheduling) while dynamic grants are applicable to all LCHs makes it impossible to enforce bitrate on different LCHs and thus slices. It is observed that configuredGrantType1Allowed does not support S-MBR enforcement as dynamic grants can be used by all LCHs.

Parameter allowedCG-List which sets the allowed configured grant(s) for transmission. This parameter introduces a list of different Configured Grant ("CGs"—i.e., semi-statically scheduled uplink resources for grant-free uplink transmission), but leads to poor resource utilizations as a gNB has to configure different configured grants for different slices which prevents efficient multiplexing of data. It is observed that allowedCG-List can when used for S-MBR enforcement result in poor resource utilizations and prevent efficient multiplexing of data.

Parameter allowedPHY-PriorityIndex sets the allowed PHY priority index(es) of a dynamic grant for transmission. That restriction can only be configured with two values and thus is applicable to separate two resources only, i.e., S-MBR for two slices only can be configured. No support for multiplexing within a given slot impacting the end-user performance and resource utilization. It is observed that allowedPHY-PriorityIndex supports S-MBR enforcement for two slices only.

Therefore, because previously defined LCH restrictions are not sufficient to provide an efficient tool for S-MBR enforcement, the disclosure presents several solutions in the UE for the enforcement of a slice specific maximum bit rate.

The multiplexing of data from different logical channels to a MAC PDU respectively transports block ("TB") is also referred to as Logical Channel Prioritization ("LCP") procedure. The LCP procedure in NR follows the same principle as in LTE and is controlled by three main parameters which are configured by RRC for each logical channel: a priority, i.e., Logical channel priority, a Prioritized Bit Rate ("PBR") and a bucket size duration ("BSD"). The idea behind prioritized bit rate is to support for each logical channel, including low priority bearers, a minimum bit rate in order to avoid a potential starvation. Each bearer should at least get enough resources in order to achieve the prioritized bit rate ("PBR").

Additional Logical channel restrictions related to allowed sub-carrier spacing ("SCS"), configured grant type, allowed serving cells and maximum PUSCH duration can be configured as well for logical channels. Those LCH restrictions were introduced specifically for NR in order to restrict the number of logical channels which are considered for an UL grant. Only those LCHs which fulfil all configured LCH restrictions are considered for the LCP procedure, i.e., uplink ("UL") grant resources are distributed among the LCHs which fulfil all configured LCH restrictions.

The LCP procedure itself is specified as a "two-step" procedure. In the first round the LCHs are served (in decreasing priority order starting with the highest priority logical channel) up to their configured PBR (implemented by means of a token bucket model). In the second round of LCP if any uplink resources remain (after meeting the PBR of the LCHs in the first round), all the logical channels are served in a strict decreasing priority order (regardless of the value of bucket) until either the data for that logical channel or the UL grant is exhausted.

The amount of data that is allocated for a selected LCH depends on: how much data resources were allocated in the past for this logical channel, the PBR and BSD values and the time elapsed from last time the LCP procedure was performed, i.e., last time UL grant for initial transmission was received.

The larger the PBR, the more resources can be allocated to an LCHs, taking into account the restriction set by BSD as well as how much resources have been allocated for past UL grants.

Each LCH maintains a variable Bj which is used to ensure that the LCH should at least get enough resources in order to achieve the prioritized bit rate (PBR), i.e., avoiding potential starvation. In the beginning Bj is set to zero. Each time when LCP is executed in response to the reception of an UL initial grant, Bj is incremented by the product PBR×T, where T is the time elapsed since Bj was last incremented, e.g., last received UL grant for initial transmission. If the value of Bj is greater than the bucket size (i.e., PBR×BSD), UE sets Bj to the bucket size. The value of Bj is decreased every time the radio resources are allocated for the LCH. If the value of Bj gets negative for an LCH, the data from this LCH does not receive resource allocations, i.e., no uplink resources are allocated to this LCH.

Figure 3:
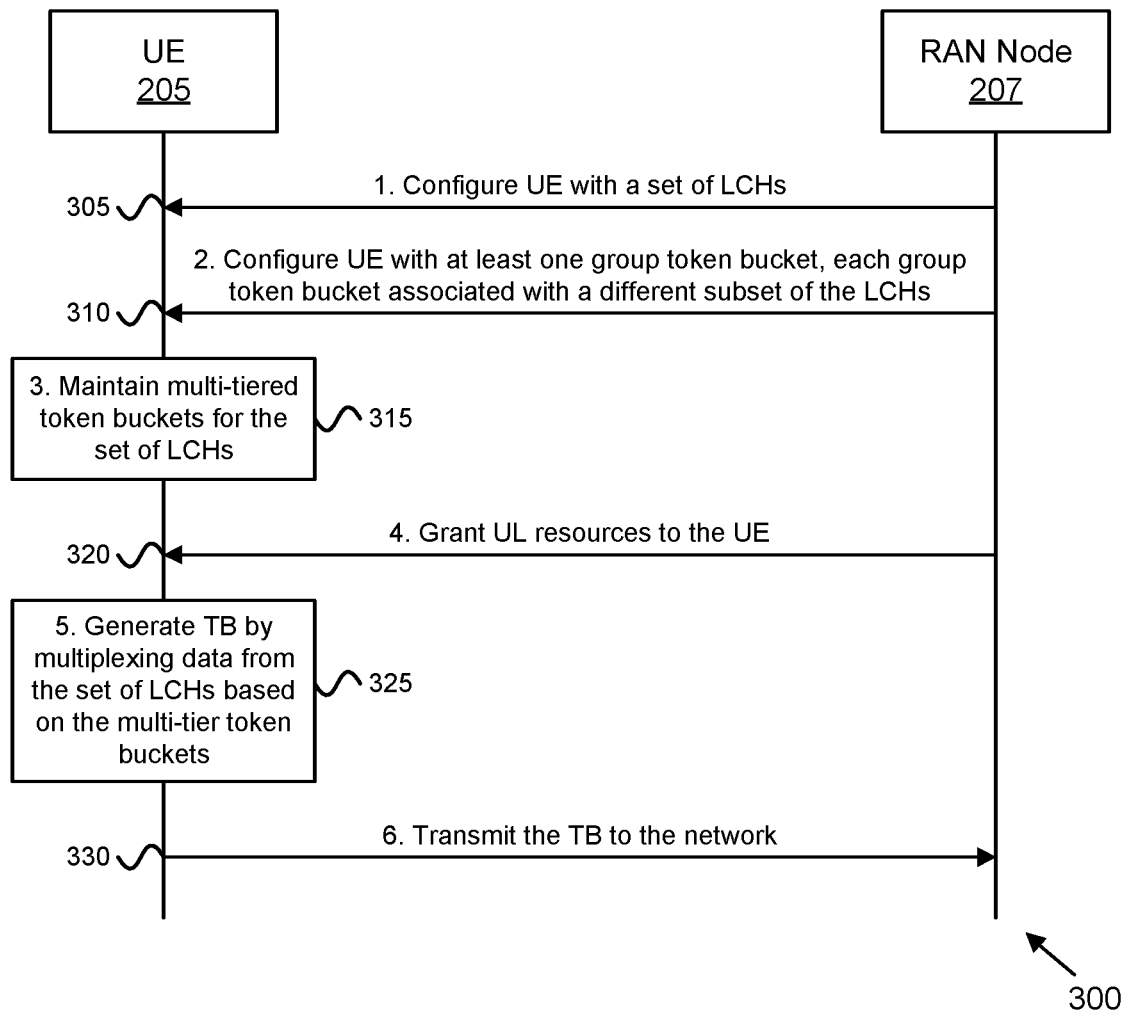
FIG. 3 is a diagram illustrating one embodiment of a procedure for uplink transmission that enforces a maximum bit rate.

FIG. 3 depicts a procedure 300 for uplink transmission that enforces a maximum bit rate, according to embodiments of the disclosure. The procedure 300 involves the UE 205 (e.g., one embodiment of the remote unit 105) and the RAN node 207 (e.g., one embodiment of the base unit 121).

At Step 1, the RAN node 207 configures the UE 205 with a set of LCHs (see messaging 305). In certain embodiments, each LCH j is associated with an LCH-specific token bucket.

At Step 2, the RAN node 207 also configures the UE 205 with at least one group token bucket (see messaging 310). Here, each group token bucket is associated with a different subset of the LCHs. As described in further detail below, each LCH may be associated with a group token bucket and each group token bucket may correspond to a network slice that serves the UE 205. In certain embodiments, the UE 205 receives a separate configuration for each group token bucket. In other embodiments, a received configuration may configure multiple group token buckets at the UE 205.

At Step 3, the UE 205 maintains multi-tiered token buckets for the set of LCHs (see block 315). An exemplary multi-tiered token bucket configuration for enforcing a slice-specific maximum bitrate, is described below with reference to FIG. 4.

Returning to FIG. 3, at Step 4, the RAN node 207 transmits a grant of UL resources to the UE 205, e.g., in DCI (see messaging 320).

At Step 5, the UE 205 generates a TB with UL data by multiplexing data from the set of LCHs based on the multi-tiered token buckets, as discussed in greater detail in the solutions below (see block 325).

At Step 6, the UE 205 transmits the generated TB to the RAN node on the granted UL resources (see messaging 330).

In a first solution, a UE is configured with an aggregated maximum bit rate, e.g., also referred to as S-MBR, and a bucket size duration ("BSD"). Compared to the legacy NR operation, RRC configures for a logical channel in addition to the logical channel priority, PBR and BSD, a maximum bit rate (i.e., S-MBR) and a second bucket size duration, which is also referred to as BSDS-MBR. According to one implementation of the first solution, the S-MBR is an aggregated maximum bit rate which is configured for a group of logical channels ("LCHs"). In one implementation the group of logical channels being configured with a S-MBR belong to one slice, i.e., S-MBR is a slice-specific maximum aggregated bit rate. The S-MBR is configured in order to enforce an aggregated maximum bit rate per slice.

Figure 4:
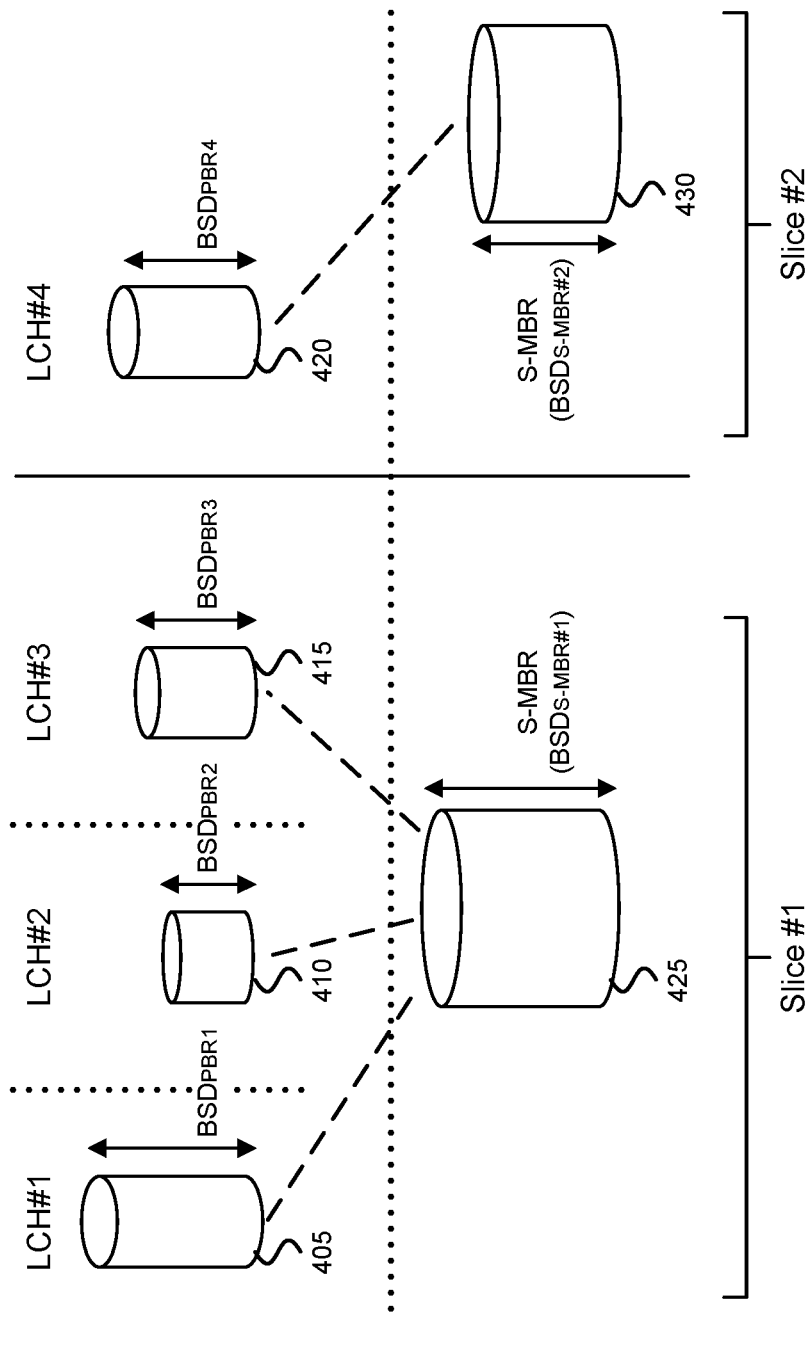
FIG. 4 is a diagram illustrating one embodiment of multi-tier token bucket configuration for logical channels for enforcing a slice-specific maximum bitrate.

FIG. 4 depicts a multi-tiered token bucket configuration 400 for logical channels for enforcing a slice-specific maximum bitrate at a UE, according to embodiments of the disclosure. As depicted, Logical Channels #1, #2, and #3 are associated with a first network slice (denoted "Slice #1"), while Logical Channel #4 is associated with a second network slice (denoted "Slice #2"). The token bucket configuration 400 uses a multi-tiered approach where each LCH has a token bucket and each slice has a token bucket, as described in greater detail herein.

In the example of FIG. 4, the first tier of the token bucket is according to the legacy NR operation, i.e., PBR is enforced with the first level of buckets. Hence, there is a first LCH-specific token bucket 405 associated with the Logical Channel #1, which token bucket 405 has a LCH-specific BSD, denoted "$BSD_{PBR1}$": a second LCH-specific token bucket 410 associated with the Logical Channel #2, which token bucket 410 has a LCH-specific BSD, denoted "$BSD_{PBR2}$": a third LCH-specific token bucket 415 associated with the Logical Channel #3, which token bucket 415 has a LCH-specific BSD, denoted "$BSD_{PBR3}$"; and a fourth LCH-specific token bucket 420 associated with the Logical Channel #4, which token bucket 420 has a LCH-specific BSD, denoted "$BSD_{PBR4}$".

According to the first solution, there is a second tier of the token bucket configured per group of LCHs (e.g., per group of LCHs belonging to same slice), which second tier enforces the aggregated maximum bit rate of a slice. Hence, there is a first slice-specific token bucket 425 which corresponds to all configured LCH associated with the first network slice, which token bucket 425 has a first slice-specific BSD (denoted "$BSD_{S\text{-}MBR\ \#1}$"), and a second slice-specific token bucket 430 which corresponds to all configured LCH associated with the second network slice, which token bucket 430 has a second slice-specific BSD (denoted "$BSD_{S\text{-}MBR\ \#2}$").

Thus, in accordance with the multi-tiered token bucket concept disclosed herein, one bucket is required for each logical channel for the prioritized bit rate enforcement and one bucket is required for each slice the UE has LCHs configured for, i.e., one bucket for the group of all LCHs/radio bearers belonging to a slice for the enforcement of the aggregated maximum bit rate of the corresponding slice.

The amount of data that is allocated for a selected LCH depends on the value of Bj. i.e., status of the first-tier bucket related to PBR and BSD (also referred to as a "PBR bucket"), and according to the first solution also depends on the bucket status of the second-tier bucket (also referred to as the "S-MBR bucket") which is enforcing the aggregated maximum bit rate of the associated slice. The bucket status of the S-MBR bucket is according to one implementation referred to as Bs. Each logical channel maintains a counter/variable Bs which is used to ensure that the maximum aggregated bit rate of the slice a LCH belongs to is not exceeded, i.e., group of LCHs belonging to the same slice are sharing/maintaining one common counter/variable Bs.

Whenever the UE assigns uplink resources to a LCH it will accordingly remove the corresponding number of tokens from the PBR bucket and correspondingly update the value of Bj. The UE will according to the first solution also remove the corresponding number of tokens from the associated S-MBR bucket and update Bs. Essentially, the UE will decrease the value of Bs every time radio resources are allocated for any LCH belonging to the associated slice (S-MBR).

According to embodiments of the first solution, uplink resources/data of an UL grant can be only allocated to a LCH if the Bs associated with this logical channel is not negative, i.e., there are tokens remaining in the associated S-MBR bucket. A negative value of Bs means that the maximum bit rate of a slice has been exceeded.

According to one specific implementation, Bs is initially set to zero for a S-MBR bucket e.g., when the first logical channel for a new Slice was established. Each time when LCP is executed in response to the reception of an UL initial grant, Bs is incremented by the product S-MBR×T, where T is the time elapsed since Bs was last incremented, e.g., last received UL grant for initial transmission. In one embodiment, if the value of Bs is greater than the bucket size (i.e., S-MBR×$BSD_{S\text{-}MBR}$), then the UE sets the value of Bs to the bucket size.

According to an exemplary implementation of the first solution, when a new transmission is performed, the UE MAC entity is to allocate resources to the logical channels as follows:

First, the logical channels selected for the UL grant which meet the conditions Bj>0 and the corresponding Bs>0 are allocated resources in a decreasing priority order. If the PBR of a logical channel is set to infinity, the MAC entity is to allocate resources for all the data that is available for transmission on the logical channel before meeting the PBR of the lower priority logical channel(s).

The UE decrements Bj and Bs by the total size of MAC SDUs served to each logical channel j above. If any resources remain, all the selected logical channels selected are served in a strict decreasing priority order (regardless of the value of Bj) until either the data for that logical channel or the UL grant is exhausted, whichever comes first. Logical channels configured with equal priority should be served equally.

According to a second solution, the UE is configured with a slice-specific PBR and a Slice-specific aggregated maximum Bitrate (i.e., S-MBR). In this solution, rather than configuring a PBR per logical channel, a common PBR is instead configured for the group of LCHs belonging to a slice.

According to a third solution, downlink control information ("DCI") allocates uplink resources, e.g., PUSCH resources, for a specific group of LCHs/radio bearer. Such group of LCHs/radio bearer may belong to one slice. According to one implementation of the third solution, the DCI contains some identifier indicating the group of radio bearer/Logical channel for which the uplink resources are allocated. According to one implementation of the third solution, each logical channel may be configured by higher layer signaling with a group identifier of length N-bits, e.g., 3 bits, the group identifier indicating to which group the logical channel belongs.

Upon receiving an UL grant allocating PUSCH resources for an initial transmission, UE selects the logical channels for the UL grant that satisfies the following condition: group identifier configured for the LCH matches the ID associated to the UL grant, i.e., signaled within the UL DCI. In one implementation such identifier signaled within the DCI may identify a slice, e.g., ID is a slice ID corresponding to e.g., an S-NSSAI value. The network configures for each LCH which slice the LCH/radio bearer belongs to. By introducing such additional LCH restriction, gNB is able to control the amount of resources allocated to a specific slice. The LCH restriction allows network to enforce a maximum bit rate for a specific slice.

In certain embodiments, Clause 5.4.3.1.2 ("Selection of logical channels") of 3GPP TS 38.321 may be modified as follows to implement of the third solution: When a new transmission is performed, the MAC entity is to select the logical channels for each UL grant that satisfy all the following conditions:

LCHgroupIndex, if configured, matches the group identifier associated to the dynamic UL grant the set of allowed Subcarrier Spacing index values in allowedSCS-List, if configured, includes the Subcarrier Spacing index associated to the UL grant; and maxPUSCH-Duration, if configured, is larger than or equal to the PUSCH transmission duration associated to the UL grant; and configuredGrantType1Allowed, if configured, is set to true in case the UL grant is a Configured Grant Type 1; and allowedServingCells, if configured, includes the Cell information associated to the UL grant. Does not apply to logical channels associated with a DRB configured with PDCP duplication within the same MAC entity (i.e., CA duplication) when CA duplication is deactivated for this DRB in this MAC entity; and allowedCG-List, if configured, includes the configured grant index associated to the UL grant; and allowedPHY-PriorityIndex, if configured, includes the priority index associated to the dynamic UL grant.

DCI format 0_0 is used for the scheduling of PUSCH in one cell. In certain embodiments, Clause 7.3.1.1.1 ("Format 0_0") of 3GPP TS 38.212 may be modified to implement the third solution by including a new field for the group identifier, e.g., a 3-bit field.

In certain embodiments of the third solution, the UE implicitly maps the DCI allocation to a group of logical channels, based on a time slot of the received DCI or on some pre-configuration. In one implementation, the system frame number or slot/symbol number may be used to identify the group of logical channels the DCI is being signaled for. In one implementation the UE may be configured with different PDCCH monitoring occasions, each PDCCH monitoring occasion configuration being used to signal an UL resource allocation for a group of logical channels. In that case, no explicit group identifier would be required in the DCI.

According to one implementation of the third solution, if UL grant is not exhausted after considering the data of the LCHs associated with the group index indicated in the DCI, the UE may use the remaining UL grant for all other LCHs, i.e., LCHs fulfilling all other LCH restrictions.

According to a fourth solution, a logical channel may be configured with a group ID. When receiving an UL grant the UE first selects the group of LCHs the resources are allocated for. In one implementation the highest priority LCH having data available for transmission and fulfilling all configured LCH restrictions determines the LCH group, which is using the allocated resources, i.e., associated group ID of the highest priority LCH having data available for transmission and fulfilling all configured LCH restrictions. The allocated UL resources are distributed among the LCHs belonging to the selected group.

In one implementation of the fourth solution, first UL resources up the PBR(s) of the LCHs belonging to the selected group are allocated. Any remaining UL resources may be allocated to LCHs not belonging to the selected LCH group.

In an alternative implementation of the fourth solution, a PBR may be configured for a group of LCHs and in the first step of the LCP procedure UL resources are allocated to the LCHs of the selected LCH group to meet the group PBR, e.g., until the bucket enforcing the group PBR is empty. According to another implementation of the fourth solution, a priority is associated with a group of logical channels. In one specific implementation, the LCHs of a logical channel group may belong to the same slice. Therefore, such group priority may be equivalent with a slice priority. When receiving an UL grant UE may maximize the data transmission for high priority slices.

According to a fifth solution, the mobile communication network may dynamically suspend radio bearer/logical channel for uplink data transmissions. According to one implementation of the fifth solution, the network entity, e.g., gNB, signals within a new MAC CE a bitmap which indicates the suspension status of a radio bearer/logical channel. Every bit within the bitmap corresponds to one LCH/radio bearer. A bit set to '0' indicates according to one exemplary implementation that uplink data transmission of the corresponding LCHs is suspended. Similarly, a bit set to '1' indicates that uplink data transmission is allowed for the corresponding LCH/radio bearer.

In response to receiving a command from the network indicating that a certain LCH is suspended for uplink data transmission, UE does not consider the LCH for LCP procedure and also does not consider the LCH for buffer status reporting. According to another implementation of the fifth solution, the bitmap indicating the suspension status of an LCH/radio bearer within a UL DCI.

Figure 5:
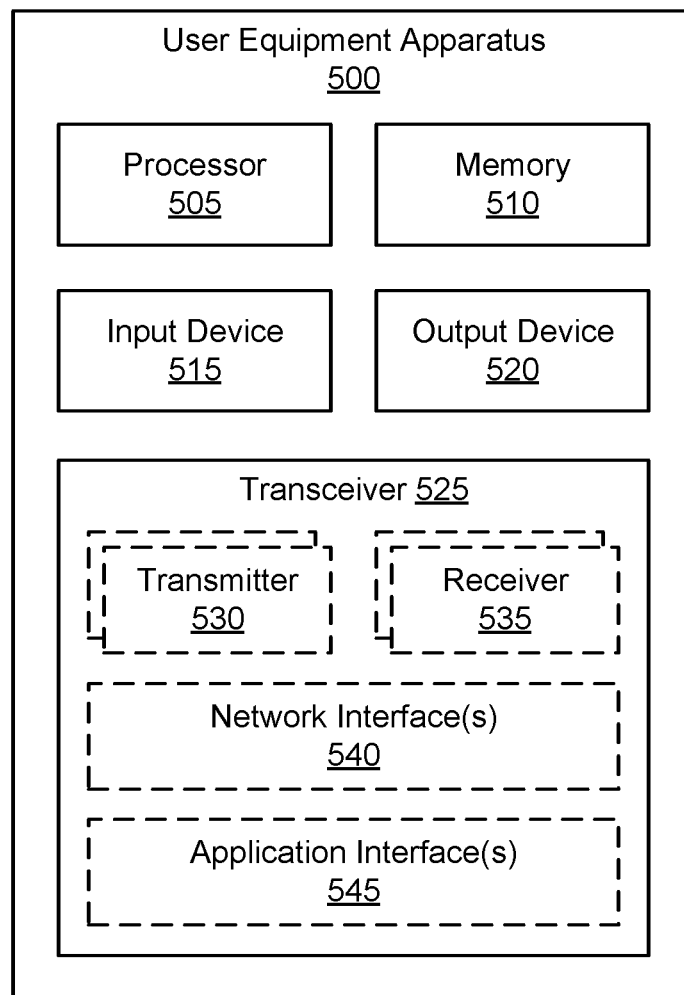
FIG. 5 is a block diagram illustrating one embodiment of a user equipment apparatus that may be used for enforcing a group-specific maximum bit rate.

FIG. 5 depicts a user equipment apparatus 500 that may be used for enforcing a group-specific maximum bit rate, according to embodiments of the disclosure. In various embodiments, the user equipment apparatus 500 is used to implement one or more of the solutions described above. The user equipment apparatus 500 may be one embodiment of a UE endpoint, such as the remote unit 105 and/or the UE 205, as described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panels supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In certain embodiments, the processor 505 may include an application processor (also known as "main processor") which manages application-domain and operating system ("OS") functions and a baseband processor (also known as "baseband radio processor") which manages radio functions.

In various embodiments, via the transceiver 525, the processor 505 receives a configuration for a set of LCHs and receives a configuration for a group token bucket associated with a subset of LCHs of the set of LCHs. Here, the configuration for the group token bucket includes an aggregated MBR and a BSD.

The processor 505 maintains, at each LCH of the subset of LCHs, a variable $B_{S\text{-}MBR}$ associated with the group token bucket. Here, the variable $B_{S\text{-}MBR}$ represents a number of bits to be used for transmission of one or more data units of the subset of LCHs, where the processor 505 increments the variable $B_{S\text{-}MBR}$ by the aggregated MBR.

The processor 505 multiplexes data from the set of LCHs based on the variable $B_{S\text{-}MBR}$ and, via the transceiver 525, transmits the multiplexed data in a TB (e.g., to the mobile communication network).

In some embodiments, each LCH of the subset of LCHs is associated with a same (i.e., common) network slice. In some embodiments, the configuration for the group token bucket configures a plurality of group token buckets, where a number of configured group token buckets corresponds to a number of network slices the UE is served with. Here, the aggregated MBR represents a bit rate limit (i.e., maximum constraint) for a network slice.

In some embodiments, the configuration for the group token bucket configures a plurality of group token buckets, where a number of configured group token buckets corresponds to a number of allowed network slices (e.g., the size of the allowed NSSAI). In some embodiments, the configuration for the group token bucket configures a plurality of group token buckets, where a number of configured group token buckets corresponds to a number of configured network slices (e.g., the size of the Configured NSSAI).

In some embodiments, the processor 505 decrements the variable $B_{S\text{-}MBR}$ by a size of transmission resources allocated to the subset of LCHs. In some embodiments, the variable $B_{S\text{-}MBR}$ is not to exceed a configured maximum size of the group token bucket. In some embodiments, the processor 505 multiplexes the data from the set of LCHs by allocating data in a decreasing priority order of the LCHs.

In some embodiments, each LCH j of the set of LCHs is associated with an individual token bucket. In such embodiments, the processor 505 maintains, at each LCH j of the set of LCHs, a variable Bj associated with the individual token bucket of that LCH. Here, the variable Bj represents a number of bits to be used for the transmission of data units of this LCH, where the processor is further configured to cause the first apparatus to increment the variable Bj by a prioritized bit rate ("PBR") associated with that LCH.

In such embodiments, the processor 505 further considers the variable Bj associated with each LCH j when multiplexing the data from the set of LCHs to form the TB. Here, the PBR represents a minimum bit rate for the LCH j. In certain embodiments, the PBR is a slice-specific value common to the subset of LCHs. In certain embodiments, the processor 505 decrements the variable Bj by a size of transmission resources allocated to the LCH j.

In some embodiments, each of the set of LCHs is configured with a group identifier, where each of the set of LCHs is associated with one of a plurality of group token buckets. In certain embodiments, via the transceiver 525, the processor 505 receives a dynamic uplink grant (e.g., DCI) for a specific group identifier. In such embodiments, the processor 505 multiplexes the data from the set of LCHs by allocating data only from the LCHs configured with the specific group identifier.

In certain embodiments, the processor 505 multiplexes the data from the set of LCHs by selecting a highest priority LCH that: 1) has data available for transmission and 2) fulfills all configured LCH restrictions. Here, the processor 505 may additionally multiplex data from one or more additional LCHs being configured with the same group identifier as the selected LCH.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to enforcing a group-specific maximum bit rate. For example, the memory 510 may store various parameters, panel/beam configurations, resource assignments, policies, and the like as described above. In certain embodiments, the memory 510 also stores program code and related data, such as an operating system or other controller algorithms operating on the user equipment apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
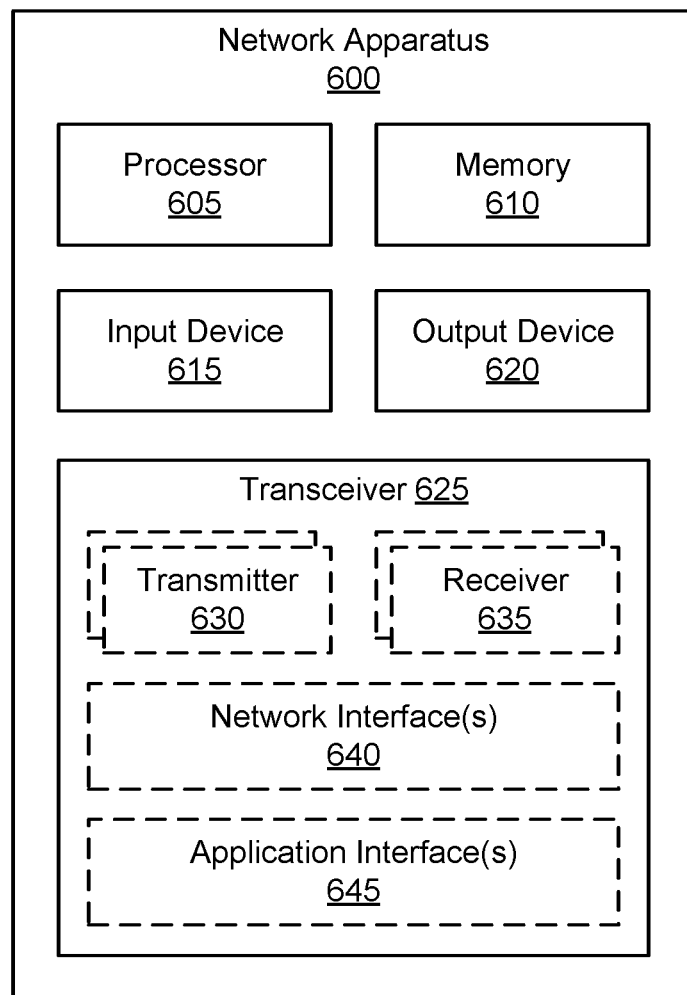
FIG. 6 is a block diagram illustrating one embodiment of a network apparatus that may be used for enforcing a group-specific maximum bit rate.

FIG. 6 depicts a network apparatus 600 that may be used for enforcing a group-specific maximum bit rate, according to embodiments of the disclosure. In one embodiment, network apparatus 600 may be one implementation of a network endpoint, such as the base unit 121 and/or RAN node 207, as described above. Furthermore, the network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the network apparatus 600 is a RAN node (e.g., gNB) that communicates with one or more UEs, as described herein. In such embodiments, the processor 605 controls the network apparatus 600 to perform the above described RAN behaviors. In some embodiments, the network apparatus 600 may configure one or more endpoint devices with the Training Sequences to be used in the key verification procedure. When operating as a RAN node, the processor 605 may include an application processor (also known as "main processor") which manages application-domain and operating system ("OS") functions and a baseband processor (also known as "baseband radio processor") which manages radio functions.

In various embodiments, via the transceiver 625, the processor 605 transmits, to a UE, a configuration for a set of LCHs and transmits, to the UE, a configuration for a group token bucket associated with a subset of LCHs of the set of LCHs. Here, the configuration for the group token bucket includes an aggregated MBR and a BSD. Via the transceiver 625, the processor 605 receives a TB transmitted by the UE, the TB including data multiplexed from the set of LCHs based on a variable $B_{S\text{-}MBR}$ associated with the group token bucket.

In some embodiments, each LCH of the subset of LCHs is associated with a same (i.e., common) network slice. In such embodiments, the aggregated maximum bit rate represents a threshold bit rate for the same network slice. In some embodiments, the configuration for the group token bucket configures a plurality of group token buckets, where a number of configured group token buckets corresponds to a number of network slices the UE is served with.

In some embodiments, the configuration for the group token bucket configures a plurality of group token buckets, where a number of configured group token buckets corresponds to a number of allowed network slices (e.g., the size of the Allowed NSSAI). In some embodiments, the configuration for the group token bucket configures a plurality of group token buckets, where a number of configured group token buckets corresponds to a number of configured network slices (e.g., the size of the Configured NSSAI).

In some embodiments, the variable $B_{S\text{-}MBR}$ is not to exceed a configured maximum size of the group token bucket. In some embodiments, each LCH j of the set of LCHs is associated with an individual token bucket. In such embodiments, the TB includes data multiplexed from the set of LCHs based on both the variable $B_{S\text{-}MBR}$ and further based on a variable Bj associated with the individual token bucket of each LCH j.

In some embodiments, each of the set of LCHs is configured with a group identifier, where each of the set of LCHs is associated with one of a plurality of group token buckets. In certain embodiments, the processor 605 further controls the transceiver 625 to transmit a dynamic uplink grant (e.g., DCI) for a specific group identifier, where the TB includes data multiplexed only from the LCHs configured with the specific group identifier.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to enforcing a group-specific maximum bit rate. For example, the memory 610 may store parameters, configurations, resource assignments, policies, and the like, as described above. In certain embodiments, the memory 610 also stores program code and related data, such as an operating system or other controller algorithms operating on the network apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the Public Land Mobile Network ("PLMN") and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

Figure 7:
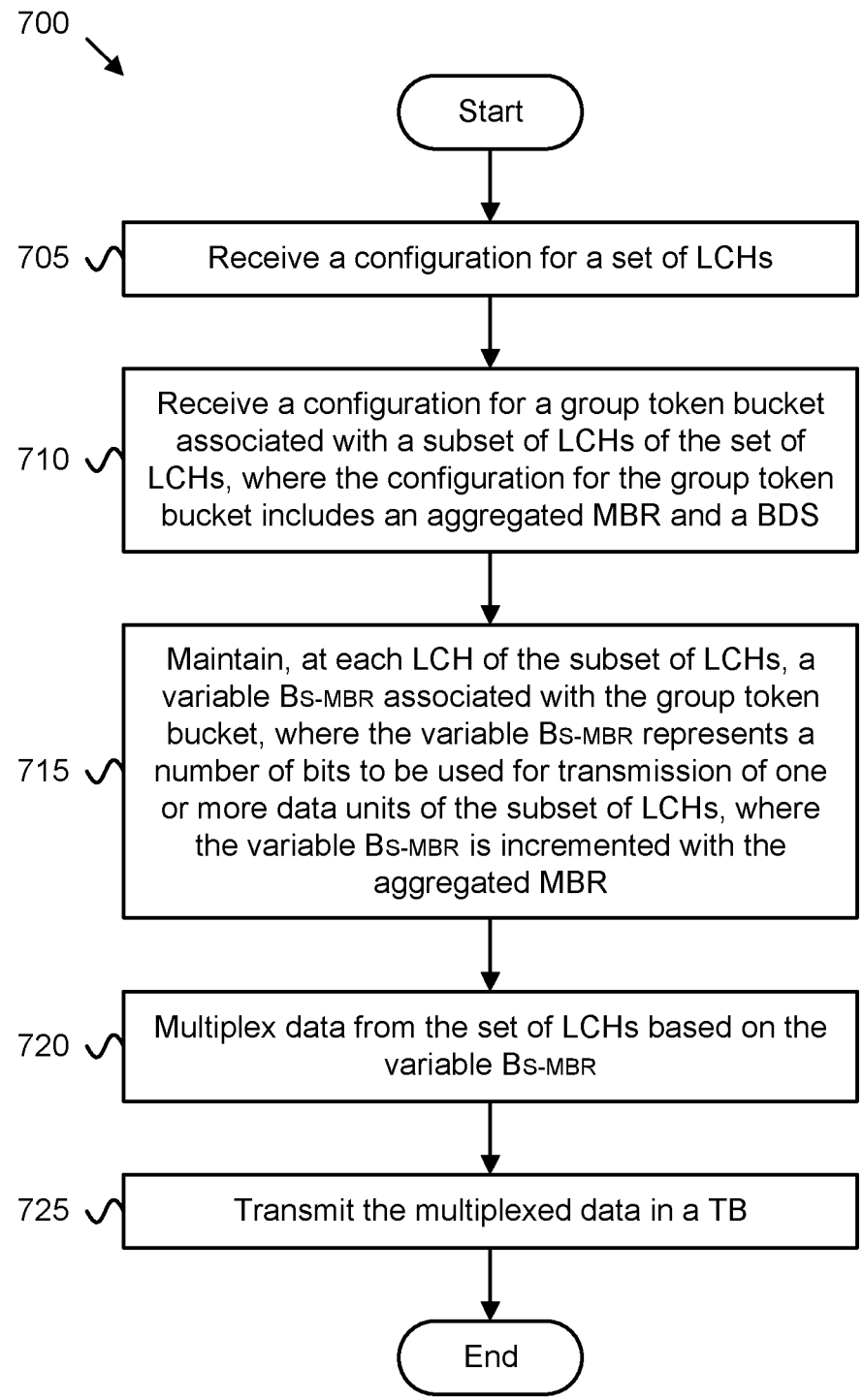
FIG. 7 is a flowchart diagram illustrating one embodiment of a first method for enforcing a group-specific maximum bit rate.

FIG. 7 depicts one embodiment of a method 700 for enforcing a group-specific maximum bit rate, according to embodiments of the disclosure. In various embodiments, the method 700 is performed by an endpoint device, such as a remote unit 105, a UE 205, and/or the user equipment apparatus 500, as described above. In some embodiments, the method 700 is performed by a processor, such as a microcontroller, a microprocessor, a CPU, a GPU, an auxiliary processing unit, a FPGA, or the like.

The method 700 begins and receives 705 a configuration for a set of LCHs. The method 700 includes receiving 710 a configuration for a group token bucket associated with a subset of LCHs of the set of LCHs. Here, the configuration for the group token bucket includes an aggregated MBR and a BSD. The method 700 includes maintaining 715, at each LCH of the subset of LCHs, a variable $B_{S\text{-}MBR}$ associated with the group token bucket. Here, the variable $B_{S\text{-}MBR}$ represents a number of bits to be used for transmission of one or more data units of the subset of LCHs, where the variable $B_{S\text{-}MBR}$ is incremented with the aggregated MBR. The method 700 includes multiplexing 720 data from the set of LCHs based on the variable $B_{S\text{-}MBR}$. The method 700 includes transmitting 725 (e.g., to the network) the multiplexed data in a TB. The method 700 ends.

Figure 8:
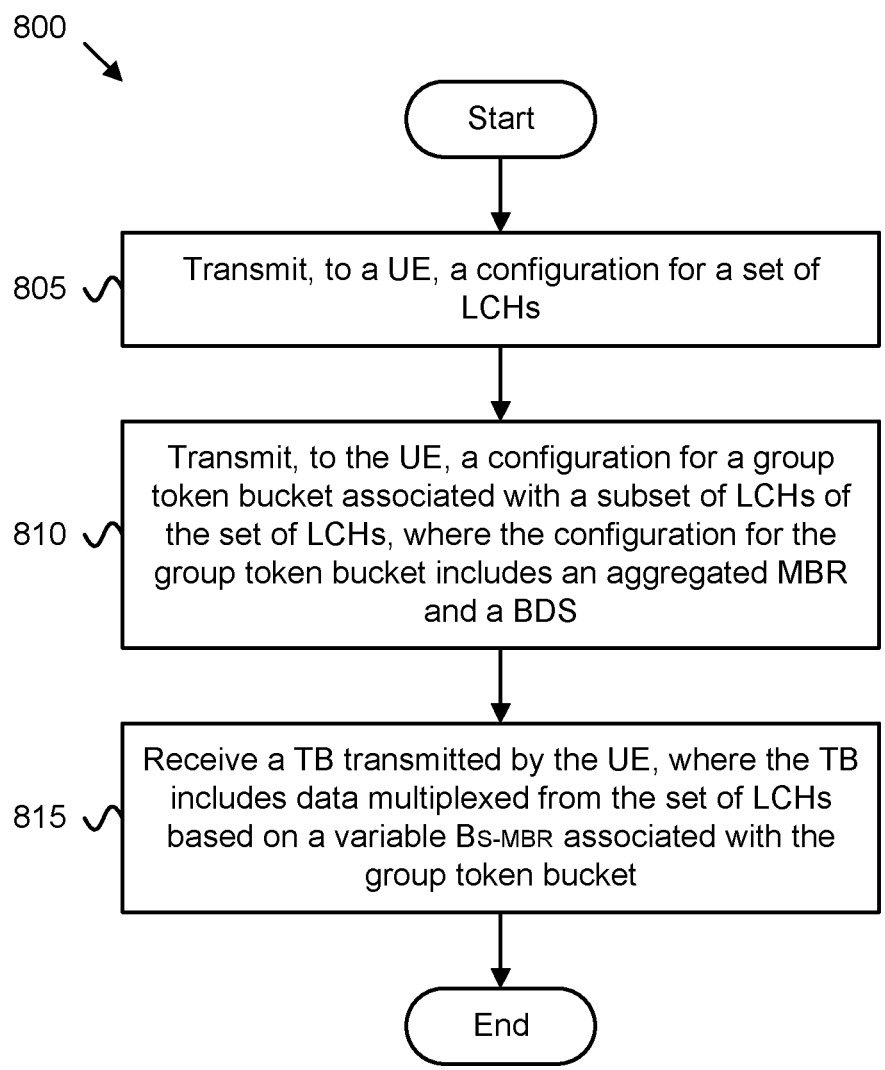
FIG. 8 is a flowchart diagram illustrating one embodiment of a second method for enforcing a group-specific maximum bit rate.

FIG. 8 depicts one embodiment of a method 800 for enforcing a group-specific maximum bit rate, according to embodiments of the disclosure. In various embodiments, the method 800 is performed by a network device, such as a base unit 121, a RAN node 207, and/or the network apparatus 600, as described above. In some embodiments, the method 800 is performed by a processor, such as a microcontroller, a microprocessor, a CPU, a GPU, an auxiliary processing unit, a FPGA, or the like.

The method 800 begins and transmits 805, to a UE, a configuration for a set of LCHs. The method 800 includes transmitting 810, to the UE, a configuration for a group token bucket associated with a subset of LCHs of the set of LCHs. Here, the configuration for the group token bucket includes an aggregated MBR and a BSD. The method 800 includes receiving 815 a TB transmitted by the UE, where the TB includes data multiplexed from the set of LCHs based on a variable $B_{S\text{-}MBR}$ associated with the group token bucket. The method 800 ends.

Disclosed herein is a first apparatus for enforcing a group-specific maximum bit rate, according to embodiments of the disclosure. The first apparatus may be implemented by an endpoint device, such as a remote unit 105, a UE 205, and/or the user equipment apparatus 500, described above. The first apparatus includes a processor coupled to a transceiver, the transceiver configured to communicate with a mobile communication network and the processor configured to cause the first apparatus to: A) receive a configuration for a set of LCHs: B) receive a configuration for a group token bucket associated with a subset of LCHs of the set of LCHs, wherein the configuration for the group token bucket includes an aggregated MBR and a BSD: C) maintain, at each LCH of the subset of LCHs, a variable $B_{S\text{-}MBR}$ associated with the group token bucket, the variable $B_{S\text{-}MBR}$ representing a number of bits to be used for transmission of one or more data units of the subset of LCHs, wherein the variable $B_{S\text{-}MBR}$ is incremented with the aggregated MBR: D) multiplex data from the set of LCHs based on the variable $B_{S\text{-}MBR}$; and E) transmit (e.g., to the mobile communication network) the multiplexed data in a TB.

In some embodiments, each LCH of the subset of LCHs is associated with a same (i.e., common) network slice. In some embodiments, the configuration for the group token bucket configures a plurality of group token buckets, where a number of configured group token buckets corresponds to a number of network slices the UE is served with.

In some embodiments, the configuration for the group token bucket configures a plurality of group token buckets, where a number of configured group token buckets corresponds to a number of allowed network slices (e.g., the size of the allowed NSSAI). In some embodiments, the configuration for the group token bucket configures a plurality of group token buckets, where a number of configured group token buckets corresponds to a number of configured network slices (e.g., the size of the Configured NSSAI).

In some embodiments, the processor is further configured to cause the first apparatus to decrement the variable $B_{S\text{-}MBR}$ by a size of transmission resources allocated to the subset of LCHs. In some embodiments, the variable $B_{S\text{-}MBR}$ is not to exceed a configured maximum size of the group token bucket. In some embodiments, to multiplex the data from the set of LCHs, the processor the processor is further configured to cause the first apparatus to allocate data in a decreasing priority order of the LCHs.

In some embodiments, each LCH j of the set of LCHs is associated with an individual token bucket. In such embodiments, the processor is further configured to cause the first apparatus to maintain, at each LCH j of the set of LCHs, a variable Bj associated with the individual token bucket of that LCH, the variable Bj representing a number of bits to be used for the transmission of data units of this LCH, where the processor is further configured to cause the first apparatus to increment the variable Bj with a PBR associated with that LCH.

In such embodiments, the processor is further configured to cause the first apparatus to multiplex the data from the set of LCHs based on the variable Bj associated with each LCH j. In certain embodiments, the PBR is a slice-specific value common to the subset of LCHs.

In certain embodiments, the processor is further configured to cause the first apparatus to decrement the variable Bj by a size of transmission resources allocated to the LCH j. In various embodiments, the PBR represents a minimum bit rate for the LCH j and the aggregated MBR represents an upper threshold bit rate for a network slice.

In some embodiments, each of the set of LCHs is configured with a group identifier, where each of the set of LCHs is associated with one of a plurality of group token buckets. In certain embodiments, the processor is further configured to cause the first apparatus to receive a dynamic uplink grant (e.g., DCI) for a specific group identifier. In such embodiments, to multiplex the data from the set of LCHs, the processor is further configured to cause the first apparatus to allocate data only from the LCHs configured with the specific group identifier.

In certain embodiments, to multiplex the data from the set of LCHs, the processor is further configured to cause the first apparatus to select a highest priority LCH having data available for transmission and fulfilling all configured LCH restrictions and to multiplex data from one or more additional LCHs being configured with the same group identifier as the selected LCH.

Disclosed herein is a first method for enforcing a group-specific maximum bit rate, according to embodiments of the disclosure. The first method may be performed by an end-point device, such as a remote unit 105, a UE 205, and/or the user equipment apparatus 500, described above. The first method includes receiving a configuration for a set of LCHs and receiving a configuration for a group token bucket associated with a subset of LCHs of the set of LCHs, wherein the configuration for the group token bucket includes an aggregated MBR and a BSD. The first method includes maintaining, at each LCH of the subset of LCHs, a variable $B_{S\text{-}MBR}$ associated with the group token bucket, the variable $B_{S\text{-}MBR}$ representing a number of bits to be used for transmission of one or more data units of the subset of LCHs, wherein the variable $B_{S\text{-}MBR}$ is incremented with the aggregated MBR. The first method includes multiplexing data from the set of LCHs based on the variable $B_{S\text{-}MBR}$ and transmitting (e.g., to the network) the multiplexed data in a TB.

In some embodiments, each LCH of the subset of LCHs is associated with a same (i.e., common) network slice. In some embodiments, the configuration for the group token bucket configures a plurality of group token buckets, where a number of configured group token buckets corresponds to a number of network slices the UE is served with.

In some embodiments, the configuration for the group token bucket configures a plurality of group token buckets, where a number of configured group token buckets corresponds to a number of allowed network slices (e.g., the size of the allowed NSSAI). In some embodiments, the configuration for the group token bucket configures a plurality of group token buckets, where a number of configured group token buckets corresponds to a number of configured network slices (e.g., the size of the Configured NSSAI).

In some embodiments, the first method further includes decrementing the variable $B_{S\text{-}MBR}$ by a size of transmission resources allocated to the subset of LCHs. In some embodiments, the variable $B_{S\text{-}MBR}$ is not to exceed a configured maximum size of the group token bucket. In some embodiments, multiplexing the data from the set of LCHs includes allocating data in a decreasing priority order of the LCHs.

In some embodiments, each LCH j of the set of LCHs is associated with an individual token bucket. In such embodiments, the first method further includes maintaining, at each LCH j of the set of LCHs, a variable Bj associated with the individual token bucket of that LCH, the variable Bj representing a number of bits to be used for the transmission of data units of this LCH, wherein the variable Bj is incremented with a PBR associated with that LCH.

In such embodiments, multiplexing the data from the set of LCHs is further based on the variable Bj associated with each LCH j. In certain embodiments, the PBR is a slice-specific value common to the subset of LCHs.

In certain embodiments, the first method further includes decrementing the variable Bj by a size of transmission resources allocated to the LCH j. In various embodiments, the PBR represents a minimum bit rate for the LCH j and the aggregated MBR represents an upper threshold bit rate for a network slice.

In some embodiments, each of the set of LCHs is configured with a group identifier, where each of the set of LCHs is associated with one of a plurality of group token buckets. In certain embodiments, the first method may further include receiving a dynamic uplink grant (e.g., DCI) for a specific group identifier. In such embodiments, multiplexing the data from the set of LCHs includes allocating data only from the LCHs configured with the specific group identifier.

In certain embodiments, multiplexing the data from the set of LCHs includes selecting a highest priority LCH having data available for transmission and fulfilling all configured LCH restrictions and multiplexing data from one or more additional LCHs being configured with the same group identifier as the selected LCH.

Disclosed herein is a second apparatus for enforcing a group-specific maximum bit rate, according to embodiments of the disclosure. The second apparatus may be implemented by a network device, such as a base unit 121, a RAN node 207, and/or the network apparatus 600, described above. The second apparatus includes a processor coupled to a transceiver, the transceiver configured to communicate with a UE and the processor configured to cause the second apparatus to: A) transmit, to the UE, a configuration for a set of LCHs: B) transmit, to the UE, a configuration for a group token bucket associated with a subset of LCHs of the set of LCHs, where the configuration for the group token bucket includes an aggregated MBR and a BSD; and C) receive a TB transmitted by the UE, the TB including data multiplexed from the set of LCHs based on a variable $B_{S\text{-}MBR}$ associated with the group token bucket.

In some embodiments, each LCH of the subset of LCHs is associated with a same (i.e., common) network slice. In such embodiments, the aggregated maximum bit rate represents a threshold bit rate for the same network slice. In some embodiments, the configuration for the group token bucket configures a plurality of group token buckets, where a number of configured group token buckets corresponds to a number of network slices the UE is served with.

In some embodiments, the configuration for the group token bucket configures a plurality of group token buckets, where a number of configured group token buckets corresponds to a number of allowed network slices (e.g., the size of the Allowed NSSAI). In some embodiments, the configuration for the group token bucket configures a plurality of group token buckets, where a number of configured group token buckets corresponds to a number of configured network slices (e.g., the size of the Configured NSSAI).

In some embodiments, the variable $B_{S\text{-}MBR}$ is not to exceed a configured maximum size of the group token bucket. In some embodiments, each LCH j of the set of LCHs is associated with an individual token bucket. In such embodiments, the TB includes data multiplexed from the set of LCHs based on both the variable $B_{S\text{-}MBR}$ and further based on a variable Bj associated with the individual token bucket of each LCH j.

In some embodiments, each of the set of LCHs is configured with a group identifier, where each of the set of LCHs is associated with one of a plurality of group token buckets. In certain embodiments, the processor is further configured to cause the second apparatus to transmit a dynamic uplink grant (e.g., DCI) for a specific group identifier, where the TB includes data multiplexed only from the LCHs configured with the specific group identifier.

Disclosed herein is a second method for enforcing a group-specific maximum bit rate, according to embodiments of the disclosure. The second method may be performed by a network device, such as a base unit 121, a RAN node 207, and/or the network apparatus 600, described above. The second method includes transmitting, to a UE, a configuration for a set of LCHs and transmitting, to the UE, a configuration for a group token bucket associated with a subset of LCHs of the set of LCHs. Here, the configuration for the group token bucket includes an aggregated MBR and a BSD. The second method includes receiving a TB transmitted by the UE, where the TB includes data multiplexed from the set of LCHs based on a variable $B_{S\text{-}MBR}$ associated with the group token bucket.

In some embodiments, each LCH of the subset of LCHs is associated with a same (i.e., common) network slice. In such embodiments, the aggregated maximum bit rate represents a threshold bit rate for the same network slice. In some embodiments, the configuration for the group token bucket configures a plurality of group token buckets, where a number of configured group token buckets corresponds to a number of network slices the UE is served with.

In some embodiments, the configuration for the group token bucket configures a plurality of group token buckets, where a number of configured group token buckets corresponds to a number of allowed network slices (e.g., the size of the Allowed NSSAI). In some embodiments, the configuration for the group token bucket configures a plurality of group token buckets, where a number of configured group token buckets corresponds to a number of configured network slices (e.g., the size of the Configured NSSAI).

In some embodiments, the variable $B_{S\text{-}MBR}$ is not to exceed a configured maximum size of the group token bucket. In some embodiments, each LCH j of the set of LCHs is associated with an individual token bucket. In such embodiments, the TB includes data multiplexed from the set of LCHs based on both the variable $B_{S\text{-}MBR}$ and further based on a variable Bj associated with the individual token bucket of each LCH j.

In some embodiments, each of the set of logical channels is configured with a group identifier, where each of the set of logical channels is associated with one of a plurality of group token buckets. In certain embodiments, the second method further includes transmitting a dynamic uplink grant (e.g., DCI) for a specific group identifier, where the TB includes data multiplexed only from the logical channels configured with the specific group identifier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a User Equipment ("UE"), the method comprising:
   receiving a configuration for a set of logical channels;
   receiving a configuration for a group token bucket associated with a subset of logical channels of the set of logical channels, wherein the configuration for the group token bucket comprises an aggregated maximum bit rate ("MBR") and a bucket size duration;
   maintaining, at each logical channel of the subset of logical channels, a variable $B_{S\text{-}MBR}$ associated with the group token bucket, the variable $B_{S\text{-}MBR}$ representing a number of bits to be used for transmission of one or more data units of the subset of logical channels, wherein the variable $B_{S\text{-}MBR}$ is incremented with the aggregated maximum bit rate;

multiplexing data from the set of logical channels based on the variable $B_{S\text{-}MBR}$; and transmitting the multiplexed data in a transport block.

2. The method of claim 1, wherein each logical channel of the subset of logical channels is associated with a same network slice.

3. The method of claim 1, wherein the configuration for the group token bucket configures a plurality of group token buckets, and wherein a number of configured group token buckets corresponds to a number of network slices the UE is served with.

4. The method of claim 1, wherein the configuration for the group token bucket configures a plurality of group token buckets, and wherein a number of configured group token buckets corresponds to a number of allowed network slices.

5. The method of claim 1, wherein the configuration for the group token bucket configures a plurality of group token buckets, and wherein a number of configured group token buckets corresponds to a number of configured network slices.

6. The method of claim 1, further comprising:
decrementing the variable $B_{S\text{-}MBR}$ by a size of transmission resources allocated to the subset of logical channels.

7. The method of claim 1, wherein the variable $B_{S\text{-}MBR}$ is not to exceed a configured maximum size of the group token bucket.

8. The method of claim 1, wherein each logical channel j of the set of logical channels is associated with an individual token bucket, the method further comprising:
maintaining, at each logical channel j of the set of logical channels, a variable Bj associated with the individual token bucket of that logical channel, the variable $B_j$ representing a number of bits to be used for transmission of data units of this logical channel, wherein the variable $B_j$ is incremented with a prioritized bit rate associated with that logical channel,
wherein multiplexing the data from the set of logical channels is further based on the variable $B_j$ associated with each logical channel j.

9. The method of claim 8, further comprising:
decrementing the variable $B_j$ by a size of transmission resources allocated to the logical channel j,
wherein the prioritized bit rate represents a minimum bit rate for the logical channel j and the aggregated maximum bit rate represents a threshold bit rate for a network slice.

10. The method of claim 8, wherein the prioritized bit rate is a slice-specific value common to the subset of logical channels.

11. The method of claim 1, wherein each of the set of logical channels is configured with a group identifier, wherein each of the set of logical channels is associated with one of a plurality of group token buckets.

12. The method of claim 11, further comprising receiving a dynamic uplink grant for a specific group identifier, wherein multiplexing the data from the set of logical channels comprises allocating data only from the logical channels configured with the specific group identifier.

13. The method of claim 11, wherein multiplexing the data from the set of logical channels comprises selecting a highest priority logical channel having data available for transmission and fulfilling all configured logical channel restrictions and multiplexing data from one or more additional logical channels being configured with a same group identifier as the selected logical channel.

14. A User Equipment ("UE") apparatus comprising:
a transceiver configured to communicate with a mobile communication network; and
a processor coupled to the transceiver, the processor configured to cause the apparatus to:
receive a configuration for a set of logical channels;
receive a configuration for a group token bucket associated with a subset of logical channels of the set of logical channels, wherein the configuration for the group token bucket comprises an aggregated maximum bit rate ("MBR") and a bucket size duration;
maintain, at each logical channel of the subset of logical channels, a variable $B_{S\text{-}MBR}$ associated with the group token bucket, the variable $B_{S\text{-}MBR}$ representing a number of bits to be used for transmission of one or more data units of the subset of logical channels, wherein the variable $B_{S\text{-}MBR}$ IS incremented with the aggregated maximum bit rate;
multiplex data from the set of logical channels based on the variable $B_{S\text{-}MBR}$; and
transmit the multiplexed data in a transport block.

15. A network apparatus comprising:
a transceiver configured to communicate with a User Equipment ("UE"); and
a processor coupled to the transceiver, the processor configured to cause the apparatus to:
transmit, to the UE, a configuration for a set of logical channels;
transmit, to the UE, a configuration for a group token bucket associated with a subset of logical channels of the set of logical channels, wherein the configuration for the group token bucket comprises an aggregated maximum bit rate ("MBR") and a bucket size duration; and
receive a transport block transmitted by the UE, the transport block comprising data multiplexed from the set of logical channels based on a variable $B_{S\text{-}MBR}$ associated with the group token bucket.

* * * * *